(12) United States Patent
Maeda et al.

(10) Patent No.: US 10,207,413 B2
(45) Date of Patent: Feb. 19, 2019

(54) END EFFECTOR, ROBOT, AND ROBOT CONTROL APPARATUS

(71) Applicant: Seiko Epson Corporation, Tokyo (JP)

(72) Inventors: Takayuki Maeda, Shiojiri (JP); Ryuichi Okada, Matsumoto (JP)

(73) Assignee: Seiko Epson Corporation (JP)

( * ) Notice: Subject to any disclaimer, the term of this patent is extended or adjusted under 35 U.S.C. 154(b) by 140 days.

(21) Appl. No.: 15/467,337

(22) Filed: Mar. 23, 2017

(65) Prior Publication Data

US 2017/0274539 A1    Sep. 28, 2017

(30) Foreign Application Priority Data

Mar. 25, 2016 (JP) ................. 2016-061381

(51) Int. Cl.
*G06F 19/00* (2018.01)
*B25J 15/10* (2006.01)
*B25J 9/16* (2006.01)

(52) U.S. Cl.
CPC .............. *B25J 15/10* (2013.01); *B25J 9/1612* (2013.01); *G05B 2219/39486* (2013.01); *G05B 2219/39496* (2013.01)

(58) Field of Classification Search
CPC .................. B25J 15/10; B25J 9/1612; G05B 2219/39486; G05B 2219/39496
USPC ........................................................ 700/245
See application file for complete search history.

(56) References Cited

U.S. PATENT DOCUMENTS

| | | | |
|---|---|---|---|
| 4,883,939 A * | 11/1989 | Sagi | B23K 9/287 219/125.1 |
| 5,437,207 A | 8/1995 | Zimmer | |
| 10,046,461 B2 * | 8/2018 | Ekas | B25J 9/104 |
| 2004/0200304 A1 | 10/2004 | Matsumoto et al. | |
| 2008/0229861 A1 | 9/2008 | Inoue et al. | |
| 2010/0261526 A1 * | 10/2010 | Anderson | G06F 3/017 463/31 |
| 2014/0305991 A1 * | 10/2014 | Parihar | A61B 17/072 227/176.1 |
| 2015/0027261 A1 | 1/2015 | Okahisa et al. | |
| 2016/0073584 A1 * | 3/2016 | Davidson | A01D 46/30 56/328.1 |
| 2018/0168620 A1 * | 6/2018 | Huang | A61B 17/07207 |

FOREIGN PATENT DOCUMENTS

| | | |
|---|---|---|
| JP | 01-118882 U | 8/1989 |
| JP | 06-508303 A | 9/1994 |
| JP | 09-150384 A | 6/1997 |
| JP | 2004-299002 A | 10/2004 |
| JP | 2008-229762 A | 10/2008 |
| JP | 2013-166215 A | 8/2013 |
| JP | 2015-024473 A | 2/2015 |

* cited by examiner

*Primary Examiner* — Ronnie M Mancho
(74) *Attorney, Agent, or Firm* — Harness, Dickey & Pierce, P.L.C.

(57) ABSTRACT

An end effector is an end effector to be grasped by a robot including a hand having a plurality of first movable parts and a second movable part using the hand, including an operation unit operated by movements of the second movable part in first directions, and an actuation unit actuated by an operation of the operation unit, wherein concave portions into which the first movable parts are inserted are formed.

15 Claims, 15 Drawing Sheets

END EFFECTOR, ROBOT, AND ROBOT CONTROL APPARATUS

BACKGROUND

1. Technical Field

The present invention relates to an end effector, a robot, and a robot control apparatus.

2. Related Art

Robots including end effectors connected to robot main body units are known (for example, see Patent Document 1 (JP-A-2015-24473)). In the robot shown in Patent Document 1, a cable for supplying air for driving the end effector is provided, for example.

In the robot of Patent Document 1, it is necessary to connect the cable to the end effector and the robot main body unit for driving the end effector. Accordingly, there is a problem that time and effort are required for attachment of the end effector and replacement of the end effector.

On the other hand, for example, in the case where an operation unit for operation is provided in the end effector itself, it is considered that the end effector is grasped by a hand of a robot as shown in Patent Document 2 (JP-A-2013-166215) and the end effector is operated by pushing and pulling the operation unit. However, when the operation unit is pushed and pulled, the position of the end effector may change with respect to the hand and a work using the end effector may not appropriately be performed. Further, the end effector may be detached from the hand.

SUMMARY

An advantage of some aspects of the invention is to provide an end effector grasped and operated by a robot for the robot to appropriately perform a work, a robot that may grasp and operate the end effector, and a robot control apparatus for the robot.

An end effector according to an aspect of the invention is an end effector to be grasped by a robot including a hand having a plurality of first movable parts and a second movable part using the hand, the end effector including an operation unit operated by movements of the second movable part in first directions, and an actuation unit actuated by an operation of the operation unit, wherein concave portions into which the first movable parts are inserted are formed.

According to the end effector of the aspect of the invention, the concave portions are formed and the robot inserts the first movable parts into the concave portions, and thereby, the end effector may be stably grasped by the hand. Accordingly, when the operation unit of the end effector is operated by the movement of the second movable part in the first directions, fluctuations of the position of the end effector with respect to the hand may be suppressed. Thereby, the robot may appropriately perform the work using the actuation unit of the end effector. Therefore, according to the end effector of the aspect of the invention, the end effector grasped and operated by the robot for the robot to appropriately perform works is obtained. Further, the end effector includes the operation unit, and thereby, the robot may drive the end effector to perform works without connection between the end effector and the robot with a cable.

The first movable parts may be finger portions, and the second movable part is a palm portion.

According to this configuration, the robot operates the operation unit using the palm portion while grasping the end effector using the finger portions. Accordingly, the robot easily performs works using the end effector.

Inner side surfaces of the concave portion may include a first portion and a second portion opposed to each other with a gap in the first directions in between, a third portion crossing second directions orthogonal to the first directions, and a fourth portion crossing third directions orthogonal to both the first directions and the second directions.

According to this configuration, the movements of the first movable parts inserted into the concave portions in the first directions, the second directions, and the third directions may be restricted by the first portion to fourth portion, and the movements of the end effector with respect to the hand in the respective directions and rotations about axes in parallel to the respective directions may be suppressed. Therefore, the accuracy of the works performed using the end effector may be further improved.

When the robot grasps the end effector, a mark part detected by the robot and used for positioning of the hand when the robot grasps the end effector may be further provided.

According to this configuration, the mark part is detected, and the hand may be accurately positioned with respect to the end effector. Thereby, a plurality of types of end effectors may be respectively easily and appropriately grasped by the hand.

The end effector may further include a main body unit in which the concave portions are formed, and four of the concave portions may be formed, and the four concave portions may be placed to surround a center of the main body unit as seen along the first directions.

According to this configuration, the first movable parts are respectively inserted into the four concave portions, and thereby, the main body unit of the end effector may be grasped more stably.

The operation unit may be a cylinder.

According to this configuration, the actuation unit of the end effector may be driven using air pressure. Thereby, force control of the actuation unit may be easily performed. Further, a suction grasp of a substrate or the like may be realized without providing a suction mechanism in the hand itself.

A robot according to an aspect of the invention is a robot that grasps the above described end effector, the robot including an arm, and a hand provided on the arm, wherein the hand includes a plurality of first movable parts inserted into the concave portions, and a second movable part moving in the first directions and operating the operation unit.

According to the robot of the aspect of the invention, the above described end effector may be stably grasped and operated, and the works using the end effector may be appropriately performed.

The first movable part may have a fitting portion to be fitted in the concave portion.

According to this configuration, the end effector may be grasped more stably.

A robot control apparatus according to an aspect of the invention is a robot control apparatus for the robot described above, the robot control apparatus controlling the robot to insert the first movable parts into the concave portions and allowing the robot to grasp the end effector, and moving the second movable part in the first directions and operating the operation unit.

According to the robot control apparatus of the aspect of the invention, the robot may be allowed to stably grasp the end effector and to operate the end effector, and thereby, to appropriately perform a predetermined work.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
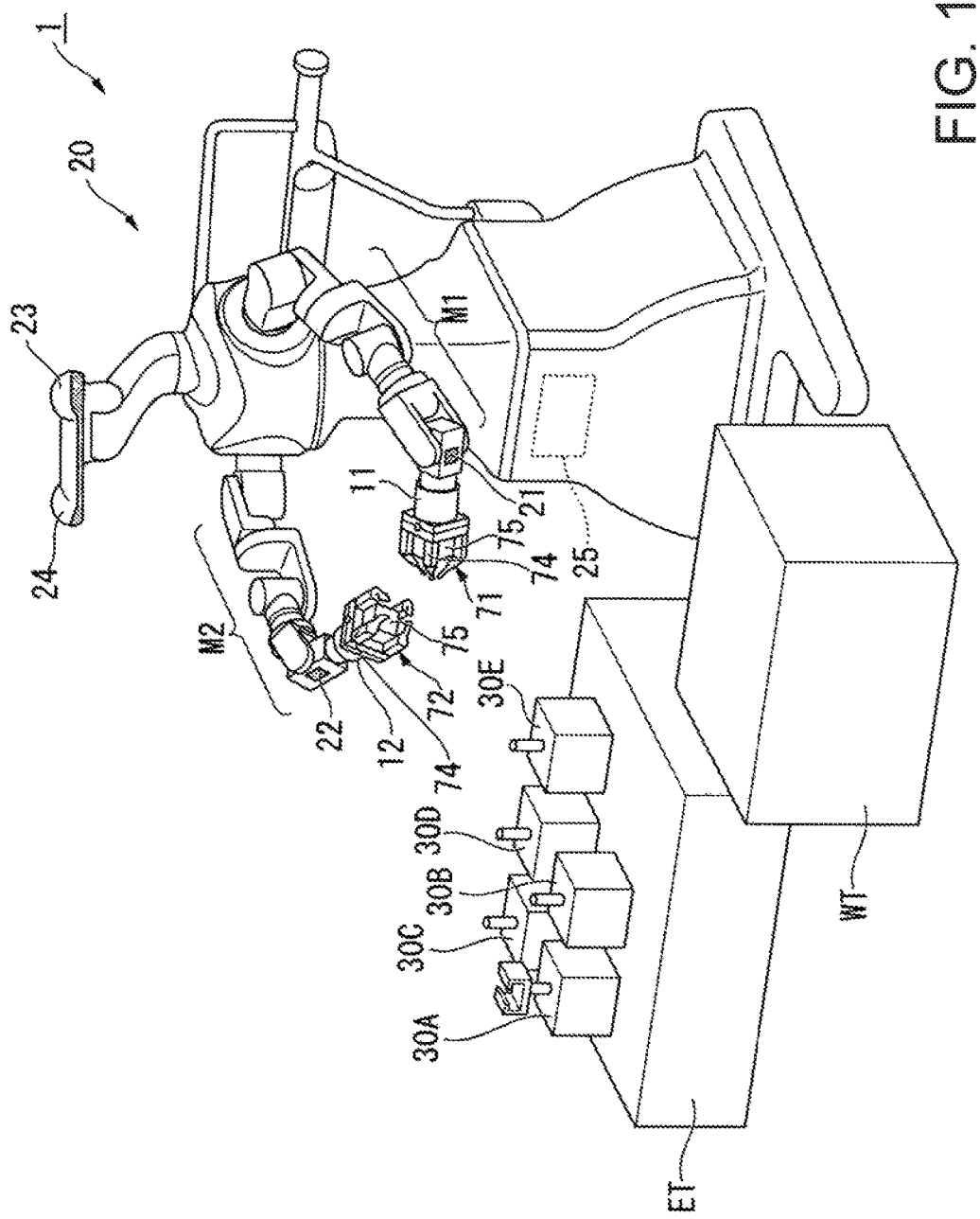
FIG. 1 is a perspective view showing a robot system of an embodiment.

As below, an end effector, a robot, and a robot control apparatus according to an embodiment of the invention will be explained with reference to the drawings. Note that the scope of the invention can be arbitrarily changed within the scope of the technical idea of the invention, not limited to the following embodiment. Further, in the following drawings, scales, numbers, etc. in the respective structures may be made different from scales numbers, etc. in the real structures for clarification of the respective configurations.

In the drawings, an XYZ coordinate system is shown as a three-dimensional orthogonal coordinate system as appropriate. In the XYZ coordinate system, Z-axis directions are upward and downward directions. Y-axis directions are directions (leftward and rightward directions in FIG. 3) of the directions orthogonal to the Z-axis directions. X-axis directions are directions (upward and downward directions in FIG. 4) orthogonal to both the Z-axis directions and the Y-axis directions.

In the following description, the Z-axis directions may be referred to as "upward and downward directions", the X-axis directions may be referred to as "forward and backward directions", and the Y-axis directions may be referred to as "leftward and rightward directions". The positive side of the Z-axis directions (+Z-side) may be referred to as "upside" and the negative side of the Z-axis directions (−Z-side) may be referred to as "downside". The positive side of the X-axis directions (+X-side) may be referred to as "front side" and the negative side of the X-axis directions (−X-side) may be referred to as "back side". The positive side of the Y-axis directions (+Y-side) may be referred to as "right side" and the negative side of the Y-axis directions (−Y-side) may be referred to as "left side".

Note that the upward and downward directions, forward and backward directions, leftward and rightward directions, upside, downside, front side, backside, right side, and left side are simply for explanation of the positional relationships among the respective parts and do not limit the actual positional relationships among the respective parts and the use modes and attitudes of the real end effector and robot.

FIG. 1 is a perspective view showing a robot system 1 of the embodiment. In the robot system 1 of the embodiment, a robot 20 performs a work on a worktable WT shown in FIG. 1. The robot 20 performs various works using one or two of end effectors 30A, 30B, 30C, 30D, 30E.

The robot 20 includes a first hand (hand) 71 and a second hand (hand) 72, and the end effectors 30A to 30E are grasped by the robot 20 using the first hand 71 or the second hand 72. The end effectors 30A to 30E are placed on e.g. an end effector placement table ET.

Figure 2:
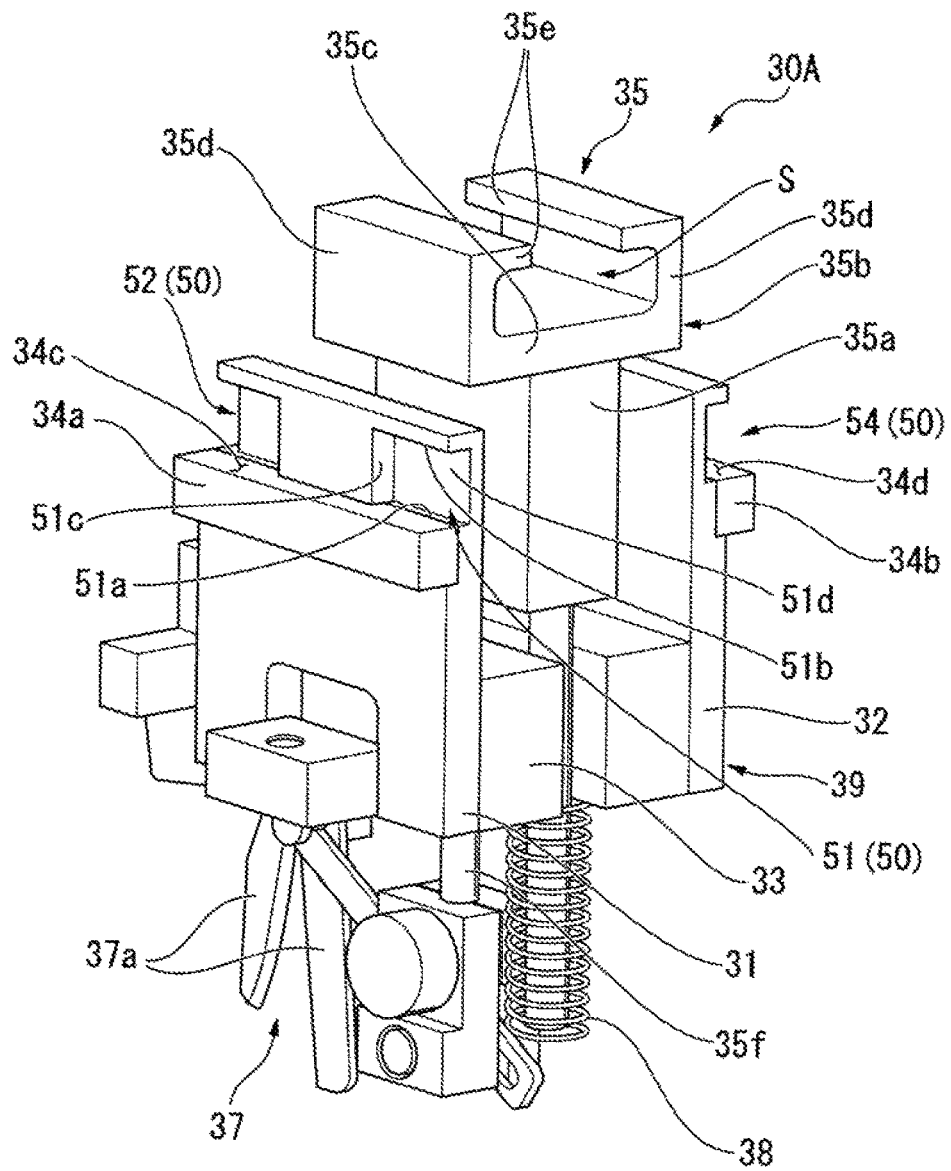
FIG. 2 is a perspective view showing an end effector of the embodiment.
Figure 2:
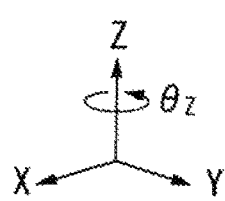
Figure 3:
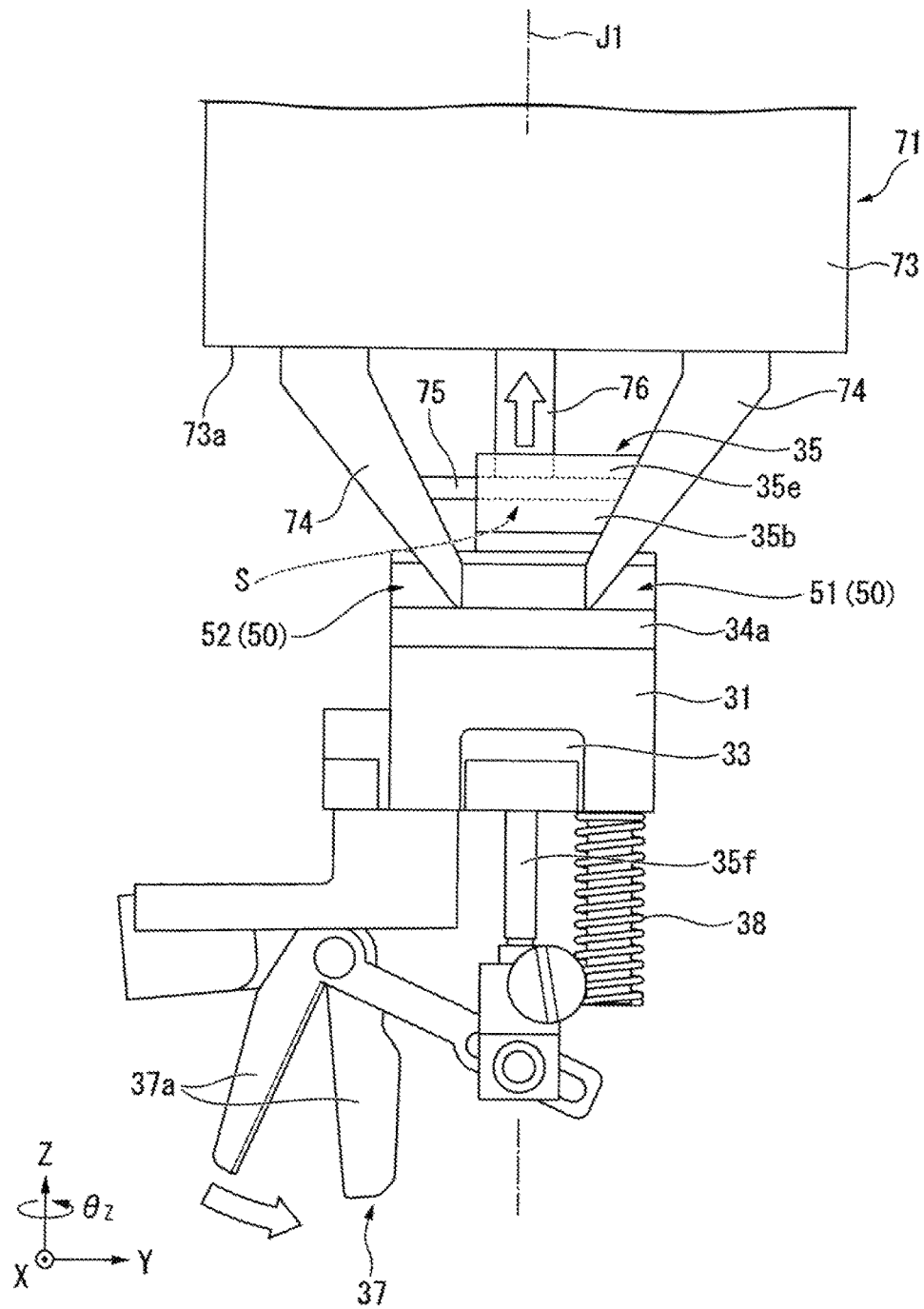
FIG. 3 is a front view showing the end effector of the embodiment.
Figure 4:
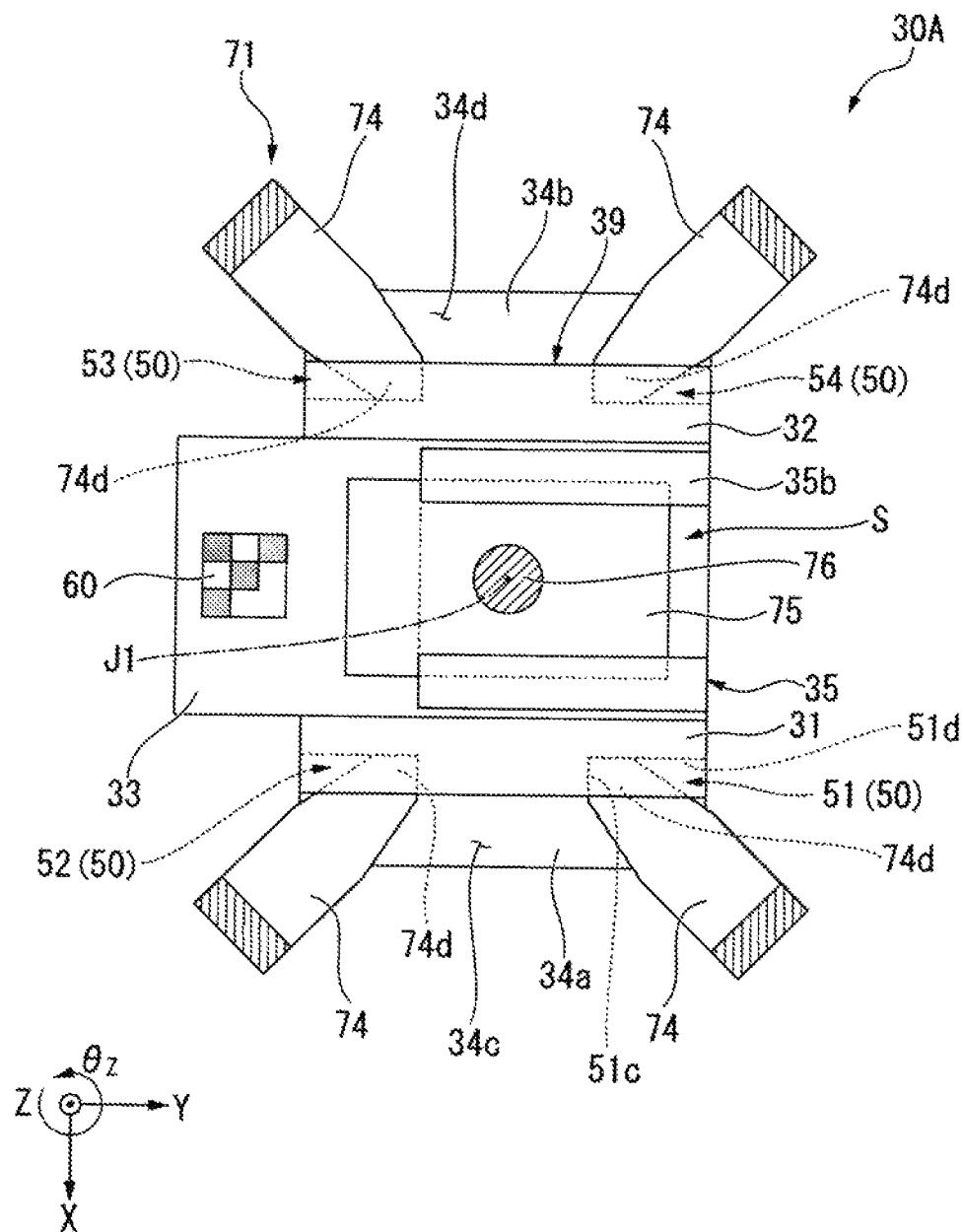
FIG. 4 is a plan view showing the end effector of the embodiment.
Figure 5:
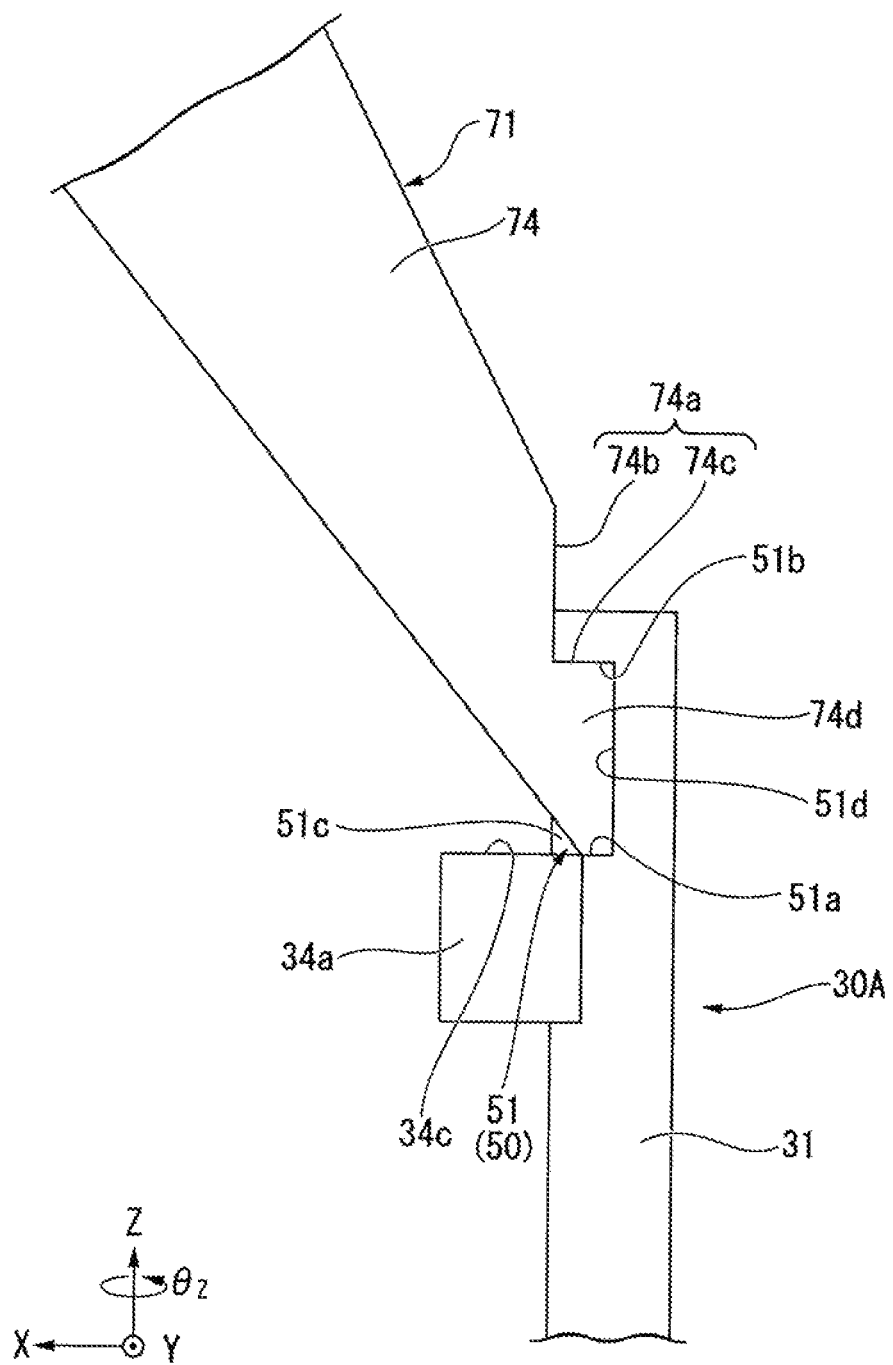
FIG. 5 is a side view showing a part of the end effector of the embodiment.

FIG. 2 is a perspective view showing the end effector 30A. FIG. 3 shows the end effector 30A as seen from the front side (+X-side) (hereinafter, a front view). FIG. 4 shows the end effector 30A as seen from the upside (hereinafter, a plan view). FIG. 5 shows a part of the end effector 30A as seen along the leftward and rightward directions (hereinafter, a side view).

The end effector 30A is an end effector for a work of cutting an object. As shown in FIGS. 2 to 4, the end effector 30A includes a main body unit 39, an operation unit 35, an actuation unit 37, and a spring 38. The main body unit 39 has a base part 33, a front plate part 31, a back plate part 32, positioning parts 34a, 34b, and a mark part 60.

The base part 33 has a rectangular parallelepiped shape. The front plate part 31 is fixed to the surface of the base part 33 on the front side (+X-side). As shown in FIG. 2, the front plate part 31 has a plate shape spreading along a surface (YZ-plane) orthogonal to the forward and backward directions. The front plate part 31 extends to the upper side than the base part 33. The shape of the front plate part 31 as seen from the front side (hereinafter, the front view shape) is a rectangular shape elongated in the upward and downward directions, for example.

Concave portions 51, 52 are formed in the front plate part 31. The concave portion 51 is concave from the front surface of the front plate part 31 toward the back side (−X-side). The concave portion 51 is formed on the right side (+Y-side) end in the upper end of the front surface of the front plate part 31. The concave portion 51 opens to the right side. The front view shape of the concave portion 51 is e.g. a rectangular shape elongated in the leftward and rightward directions (Y-axis directions).

The inner side surfaces of the concave portion 51 include a first portion 51a, a second portion 51b, a third portion 51c, and a fourth portion 51d. The first portion 51a and the second portion 51b are portions opposed to each other via a gap in the upward and downward directions (first directions). The first portion 51a is the downside surface of the inner side surfaces of the concave portion 51. The second portion 51b is the upside surface of the inner side surfaces of the concave portion 51.

The third portion 51c is a portion crossing the leftward and rightward directions (second directions) orthogonal to the upward and downward directions. In the embodiment, the third portion 51c is orthogonal to the leftward and rightward directions, for example. The third portion 51c is the left side (−Y-side) surface of the inner side surfaces of the concave portion 51.

The fourth portion 51d is a portion crossing the forward and backward directions (third directions) orthogonal to both the upward and downward directions and the leftward and rightward directions. In the embodiment, the fourth portion 51d is orthogonal to the forward and backward directions, for example. The fourth portion 51d is the back side (−X-side) surface of the inner side surfaces of the concave portion 51.

The concave portion 52 is concave from the front surface of the front plate part 31 toward the back side (−X-side). The concave portion 52 is formed on the left side (−Y-side) end in the upper end of the front surface of the front plate part 31. The concave portion 52 opens to the left side. The front view shape of the concave portion 52 is e.g. a rectangular shape elongated in the leftward and rightward directions (Y-axis directions). The shape of the concave portion 52 is the same as that of the concave portion 51 except the inversion in the leftward and rightward directions.

The concave portion 51 and the concave portion 52 are provided in the same position in the upward and downward directions and formed on the opposite sides to each other with the center of the front plate part 31 in the leftward and rightward directions (Y-axis directions) in between.

The back plate part 32 is fixed to the surface of the base part 33 on the back side (−X-side). The back plate part 32 has a plate shape spreading along a surface (YZ-plane) orthogonal to the forward and backward directions. The back plate part 32 extends to the upper side than the base part 33. The shape of the back plate part 32 as seen from the back side is a rectangular shape elongated in the upward and downward directions, for example.

As shown in FIG. 4, concave portions 53, 54 are formed in the back plate part 32. The concave portions 53, 54 are concave from the back surface of the back plate part 32 toward the front side (+X-side). The concave portion 53 is provided in the same position as that of the concave portion 52 in the upward and downward directions and the leftward and rightward directions and formed on the opposite side to the concave portion 52 with the center of the end effector 30A in the forward and backward directions in between. The shape of the concave portion 53 is the same as that of the concave portion 52 except the inversion in the forward and backward directions.

The concave portion 54 is provided in the same position as that of the concave portion 51 in the upward and downward directions and the leftward and rightward directions and formed on the opposite side to the concave portion 52 with the center of the end effector 30A in the forward and backward directions in between. The shape of the concave portion 54 is the same as that of the concave portion 51 except the inversion in the forward and backward directions.

As described above, in the main body unit 39 of the embodiment, four concave portions 51 to 54 are formed as a plurality of concave portions 50. The four concave portions 50 are provided to surround the center of the main body unit 39 as seen along the upward and downward directions. In the embodiment, the four concave portions 50 are located in four corners of the main body unit 39 in the plan view. When the end effector 30A is grasped by the robot 20, finger portions 74, which will be described later, are inserted into the respective concave portions 50.

As shown in FIG. 2, the positioning part 34a is fixed to the front surface of the front plate part 31. The positioning part 34a has a quadrangular prism shape extending in the leftward and rightward directions, for example. The positioning part 34a extends from one end to the other end of the front plate part 31 in the leftward and rightward directions. As shown in FIG. 5, an upper surface 34c of the positioning part 34a is in the same position as that of the first portion 51a of the concave portion 51 in the upward and downward directions. The upper surface 34c of the positioning part 34a and the first portion 51a are connected to each other and form a surface orthogonal to the upward and downward directions. Also, the upper surface 34c of the positioning part 34a and the first portion of the concave portion 52 are connected to each other in the same position in the upward and downward directions and form a surface orthogonal to the upward and downward directions.

As shown in FIGS. 2 and 4, the positioning part 34b is fixed to the back surface of the back plate part 32. The positioning part 34b has a quadrangular prism shape extending in the leftward and rightward directions. The positioning part 34b extends from one end to the other end of the back plate part 32 in the leftward and rightward directions. An upper surface 34d of the positioning part 34b and the first portion of the concave portion 53 and the first portion of the concave portion 54 are connected to each other in the same position in the upward and downward directions and form a surface orthogonal to the upward and downward directions.

As shown in FIG. 4, the mark part 60 is provided on the upper surface of the base part 33, for example. The mark part 60 is detected by the robot 20 when the robot 20 grasps the end effector 30A. The mark part 60 is used for positioning of the first hand 71 or the second hand 72. The mark part 60 contains information on the end effector 30A. The information on the end effector 30A includes e.g. information representing the type of the end effector and information of the placement position of the end effector.

The operation unit 35 is attached movably in the upward and downward directions with respect to the base part 33. The operation unit 35 is operated by movements of a palm portion 75, which will be described later, in the upward and downward directions. More specifically, the operation unit is moved in the upward and downward directions with the movements of the palm portion 75 in the upward and downward directions.

The operation unit 35 is provided between the front plate part 31 and the back plate part 32 in the forward and backward directions. As shown in FIG. 2, the operation unit 35 has a shaft part 35f, a connecting part 35a, and an engaging part 35b. The shaft part 35f has a cylindrical shape extending in the upward and downward directions, and is provided to penetrate the base part 33 in the upward and downward directions. The lower end of the shaft part 35f is connected to the actuation unit 37.

The connecting part 35a is connected to the upper end of the shaft part 35f. The connecting part 35a has a rectangular parallelepiped shape. The engaging part 35b is connected to the upper end of the connecting part 35a. The engaging part 35b has a lower wall portion 35c, side wall portions 35d, and upper wall portions 35e.

The lower wall portion 35c has a plate shape extending from the upper end of the connecting part 35a in the forward and backward directions. The side wall portions 35d have plate shapes extending upward from both ends of the lower wall portion 35c in the forward and backward directions.

The upper wall portions 35e have plate shapes extending from the respective upper ends of the side wall portions 35d toward the opposite side wall portions 35d. An insertion space S is formed by the lower wall portion 35c, the side wall portions 35d, and the upper wall portions 35e in the engaging part 35b.

The actuation unit 37 is actuated by the operation of the operation unit 35. As shown in FIG. 3, the actuation unit 37 has a scissors part 37a that can cut an object. The scissors part 37a closes when the operation unit 35 (shaft part 35f) moves to the upside and opens when the operation unit 35 (shaft part 35f) moves to the downside. FIG. 3 shows a state in which the scissors part 37a opens.

The spring 38 applies a downward elastic force to the operation unit 35 via the actuation unit 37. The lower end of the spring 38 is connected to the actuation unit 37. The upper end of the spring 38 is in contact with the lower surface of the base part 33. When not operated by the robot 20, the operation unit 35 is held on the downside by the spring 38 and the actuation unit 37 is held with the scissors part 37a open as shown in FIG. 3.

Figure 6:
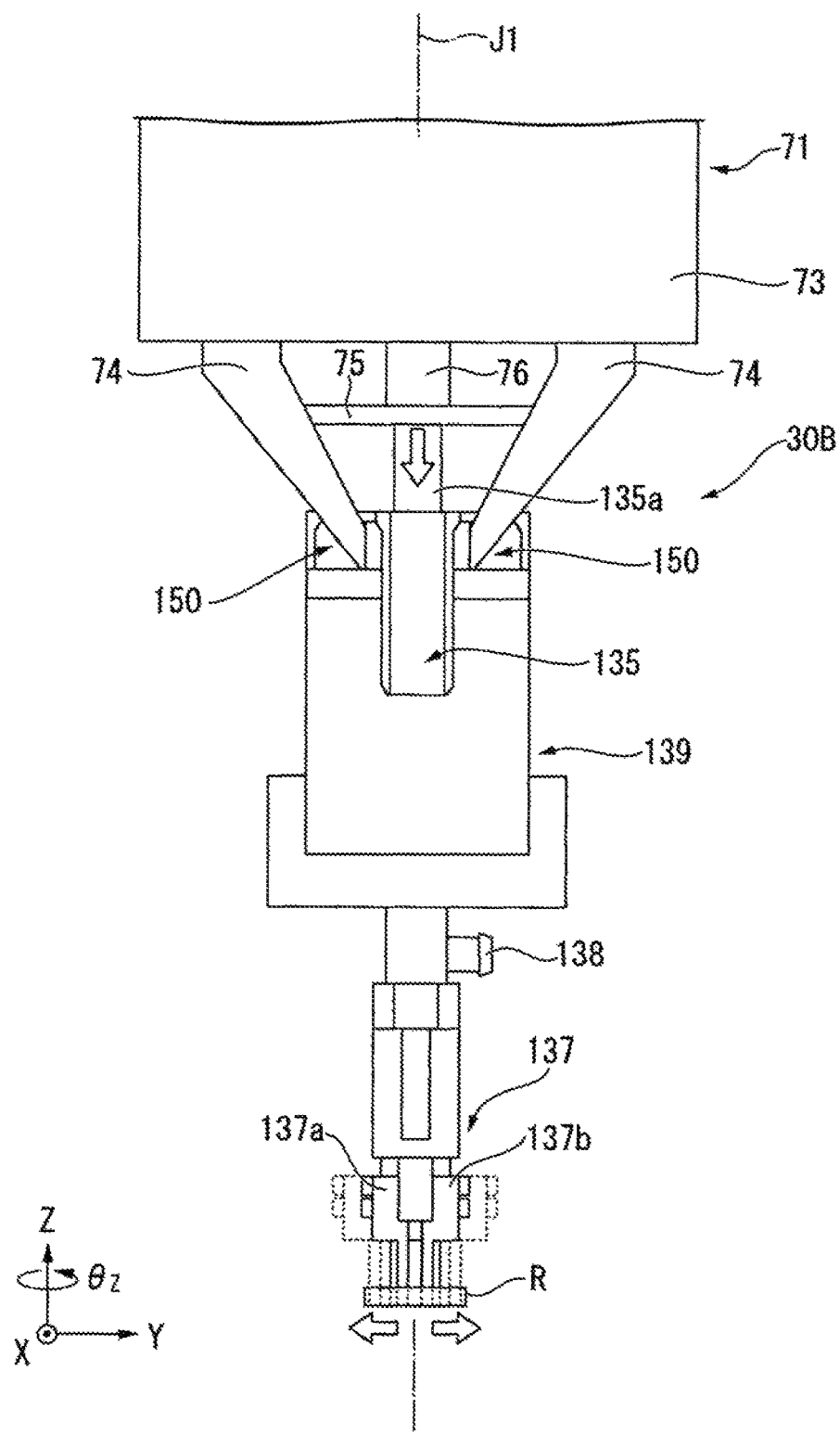
FIG. 6 is a front view showing an end effector of the embodiment.

FIG. 6 is a front view showing the end effector 30B. The end effector 30B is an end effector for grasping an annular member R along the inner diameter. As shown in FIG. 6, the end effector 30B includes a main body unit 139, an operation unit 135, and an actuation unit 137. A plurality of concave portions 150 are formed in the main body unit 139. For example, four of the concave portions 150 are formed like the concave portions 50 of the end effector 30A. The concave portions 150 are different from the concave portions 50 in that the concave portions 150 are not open in the leftward and rightward directions. The rest of the configurations of the concave portions 150 are the same as those of the concave portions 50. The rest of the configurations of the main body unit 139 are the same as those of the main body unit 39 of the end effector 30A.

The operation unit 135 is a cylinder. The interior of the operation unit 135 is connected to a supply port 138 of the actuation unit 137 via a tube (not shown). The operation unit 135 has a shaft part 135a. The shaft part 135a has a cylindrical shape extending in the upward and downward directions, and is movable in the upward and downward directions. The shaft part 135a moves to the downside, and thereby, the air within the operation unit 135 is supplied from the supply port 138 to the actuation unit 137 via the tube.

The actuation unit 137 has chuck parts 137a, 137b and the support port 138. The chuck parts 137a, 137b extend in the upward and downward directions and opposed to each other in the horizontal directions (in FIG. 6, in the leftward and rightward directions). When the shaft part 135a moves to the downside and the air is supplied from the supply port 138, the chuck parts 137a, 137b move away from each other. Thereby, the annular member R may be grasped along the inner diameter by the chuck parts 137a, 137b.

Though not illustrated, a spring is provided in the end effector 30B and an upward elastic force is applied to the shaft part 135a of the operation unit 135 by the spring. Thereby, when not operated by the robot 20, the operation unit 135 is held on the upside by the spring and the actuation unit 137 is held with the chuck parts 137a, 137b close to each other (closed).

Figure 7:
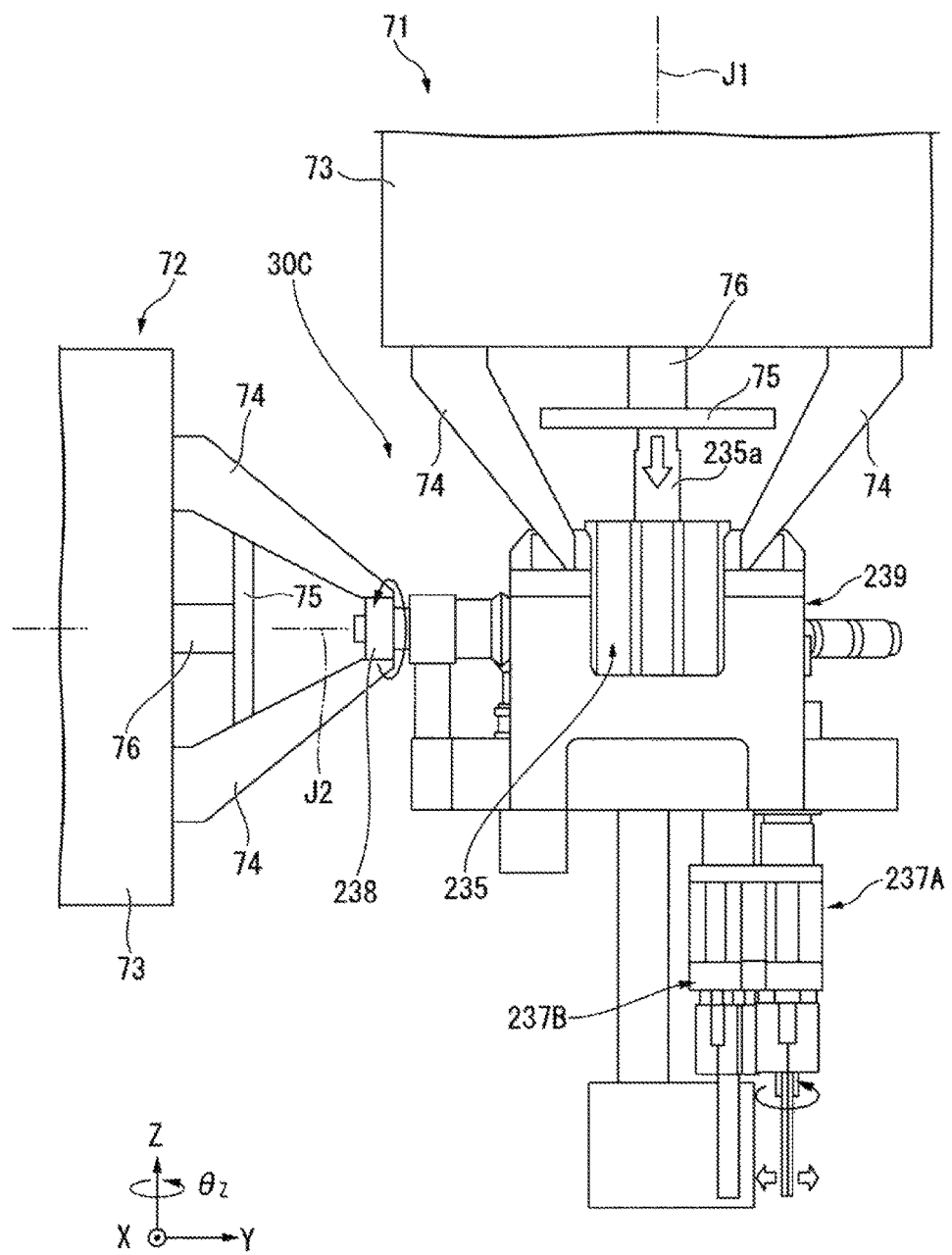
FIG. 7 is a front view showing an end effector of the embodiment.

FIG. 7 is a front view showing the end effector 30C. The end effector 30C is an end effector for grasping an annular member R along the inner diameter. In the end effector 30C, two actuation units that can grasp the annular member R along the inner diameter are provided.

As shown in FIG. 7, the end effector 30C includes a main body unit 239, an operation unit 235, actuation units 237A, 237B, and a second operation unit 238. The main body unit 239 is the same as the main body unit 139 of the end effector 30B. The operation unit 235 is a cylinder. A shaft part 235a of the operation unit 235 moves to the downside, and thereby, the air is supplied to the actuation units 237A, 237B via a tube and a supply port (not shown).

The configurations of the actuation units 237A, 237B are the same as that of the actuation unit 137 of the end effector 30B. When the air is supplied from the operation unit 235, the respective chuck parts open and the actuation units 237A, 237B may grasp the annular member R along the inner diameter.

The second operation part 238 extends in the horizontal directions (in FIG. 7, in the leftward and rightward directions). The second operation part 238 is rotatable about a rotation shaft J2 parallel to the horizontal directions. The second operation part 238 is connected to the actuation unit 237A via a rotation transform mechanism (not shown). The rotation transform mechanism transforms the rotation of the second operation part 238 about the rotation shaft J2 into rotation of the actuation unit 237A about an axis parallel to the upward and downward directions.

The second operation part 238 is operated by e.g. the second hand 72 with the end effector 30C grasped by the first hand 71.

Though not illustrated, a spring is provided in the end effector 30C and an upward elastic force is applied to the shaft part 235a of the operation unit 235 by the spring. Thereby, when not operated by the robot 20, the operation unit 235 is held on the upside by the spring and the actuation units 237A, 237B are held with the respective chuck parts close to each other (closed).

Figure 8:
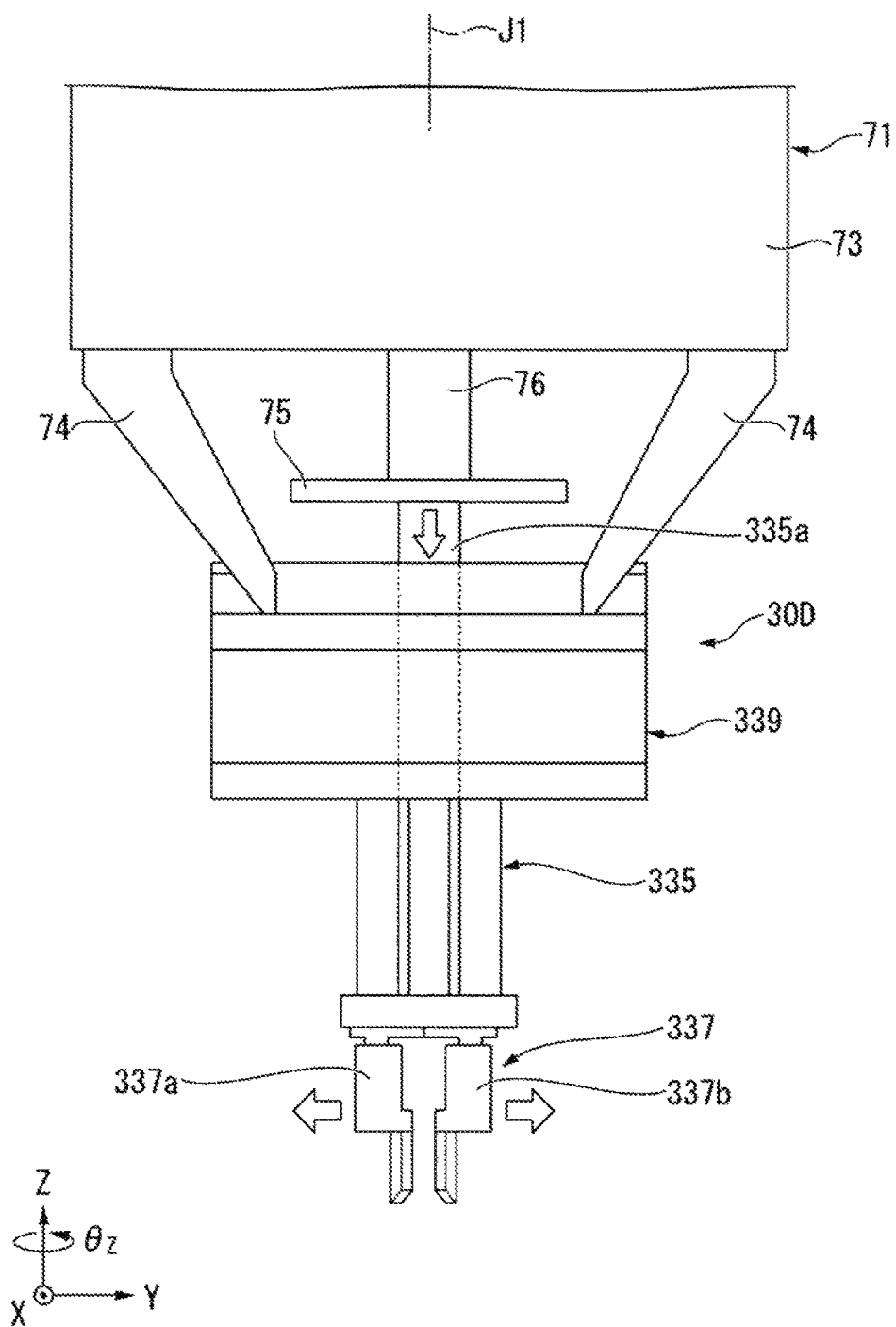
FIG. 8 is a front view showing an end effector of the embodiment.

FIG. 8 is a front view showing the end effector 30D. The end effector 30D is an end effector for grasping an annular member R along the inner diameter. As shown in FIG. 8, the end effector 30D includes a main body unit 339, an operation unit 335, and an actuation unit 337. The main body unit 339 is the same as the main body unit 39 of the end effector 30A. The operation unit 335 is a cylinder. A shaft part 335a of the operation unit 335 moves to the downside, and thereby, the air is supplied to the actuation unit 337 via a tube and a supply port (not shown).

The actuation unit 337 has collet chuck parts 337a, 337b. The collet chuck parts 337a, 337b extend in the upward and downward directions and are opposed to each other in the horizontal directions (in FIG. 8, in the leftward and rightward directions). When the shaft part 335a moves to the downside and the air is supplied to the actuation unit 337, the collet chuck parts 337a, 337b move away from each other. Thereby, the annular member R may be grasped along the inner diameter by the collet chuck parts 337a, 337b.

Though not illustrated, a spring is provided in the end effector 30D and an upward elastic force is applied to the shaft part 335a of the operation unit 335 by the spring. Thereby, when not operated by the robot 20, the operation unit 335 is held on the upside by the spring and the actuation unit 337 is held with the collet chuck parts 337a, 337b close to each other (closed).

Figure 9:
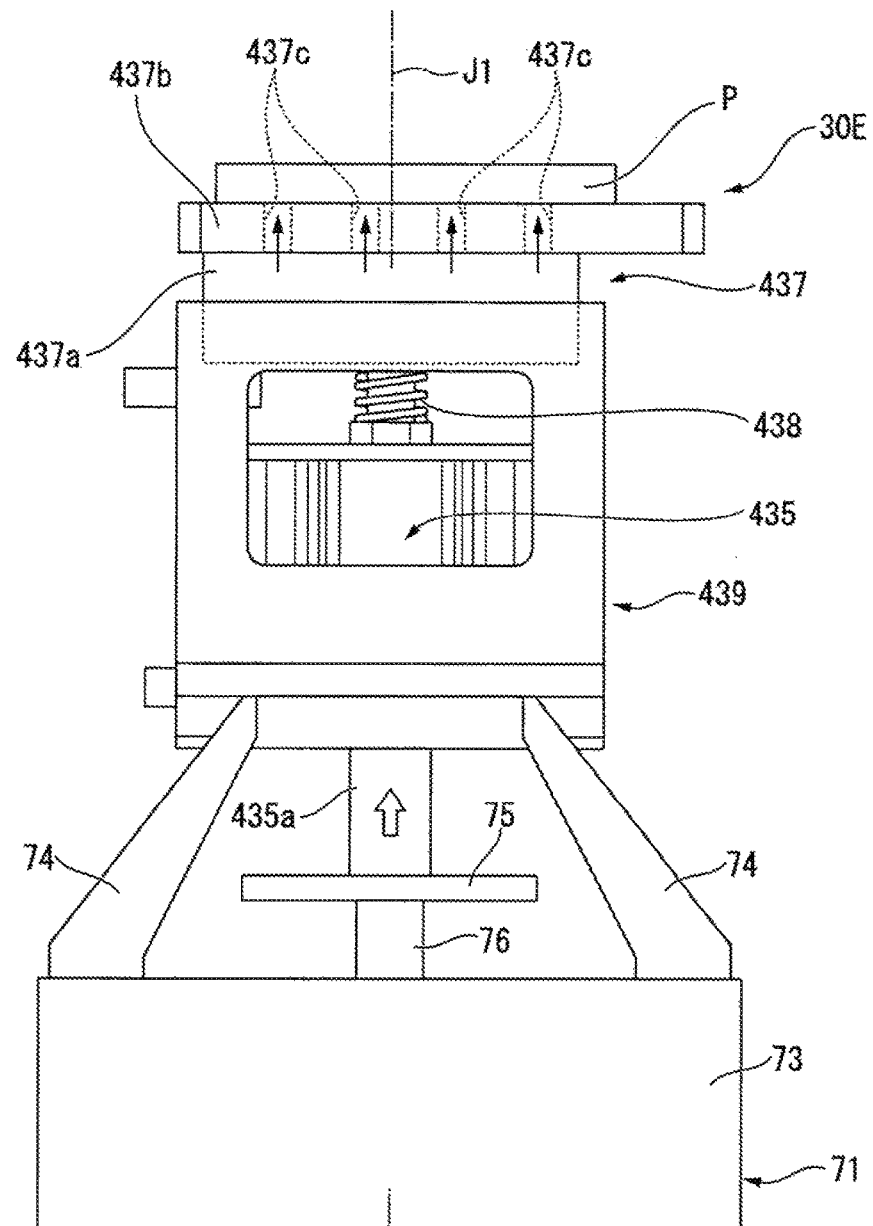
FIG. 9 is a front view showing an end effector of the embodiment.

FIG. 9 is a front view showing the end effector 30E. The end effector 30E is an end effector for holding a substrate P by suction. As shown in FIG. 9, the end effector 30E includes a main body unit 439, an operation unit 435, an actuation unit 437, and a spring 438. The end effector 30E is used in an upside-down attitude, i.e., an attitude in which the operation unit 435 is located on the downside with respect to the actuation unit 437 unlike the other end effectors 30A to 30D.

The main body unit 439 is the same as the main body unit 39 of the end effector 30A. The operation unit 435 is a cylinder. The actuation unit 437 has a vacuum chamber 437a and a holder part 437b. The interior of the vacuum chamber 437a is connected to a plurality of through holes 437c formed in the holder part 437b. The through holes 437c penetrate the holder part 437b in the upward and downward directions. The substrate P is mounted on the upper surface of the holder part 437b.

When a shaft part 435a of the operation unit 435 moves to the downside, the air is exhausted from within the vacuum chamber 437a. In this regard, when the through holes 437c of the holder part 437b are closed by the substrate P, the interior of the vacuum chamber 437a is in the vacuum state and the substrate P is held on the holder part 437b by suction. On the other hand, when the shaft part 435a moves to the upside (when the operation unit 435 is operated by the palm portion 75 to be described later), the air is supplied to the vacuum chamber 437a. The air supplied to the vacuum chamber 437a is exhausted from the through holes 437c. Thereby, the holding state of the substrate P is released.

The spring 438 applies a downward elastic force to the shaft part 435a. Thereby, when not operated by the robot 20, the operation unit 435 is held on the downside by the spring 438.

Note that, in the following description, only the case where the robot 20 grasps the end effector 30A may be representatively explained.

As shown in FIG. 1, the robot 20 is a dual-arm robot including a first arm, a second arm, a support that supports the first arm and the second arm, and a robot control apparatus 25. The dual-arm robot includes two arms like the first arm and the second arm in the example shown in FIG. 1. Note that the robot 20 may be a single-arm robot in place of the dual-arm robot. The single-arm robot is a robot including a single arm. For example, the single-arm robot includes one of the first arm and the second arm. Or, the robot 20 may be a multi-arm robot including three or more arms in place of the dual-arm robot.

The first arm has the first hand 71, a first manipulator M1, and a first force detection unit 11. Note that, in the embodiment, the case where the first hand 71 is provided on the first arm is explained, however, the first hand 71 may be provided separately from the first arm. In this case, the first arm has the first manipulator M1 and the first force detection unit 11.

In the embodiment, the first hand 71 is a part corresponding to a hand of the first arm. As shown in FIG. 3, the first hand 71 has a base portion 73, the plurality of finger portions (first movable parts) 74, the palm portion (second movable part) 75, and a shaft portion 76. The base portion 73 supports the plurality of finger portions 74. The base portion 73 has e.g. a quadrangular prism shape. In the embodiment, a motor is provided in the base portion 73. Thereby, the base portion 73 is rotatable about a rotation shaft J1 (±θz-directions).

Further, a high-accuracy encoder is provided in the rotation shaft J1 of the motor and the base portion 73 can be rotated with high accuracy. The rotation shaft J1 is orthogonal to a supporting surface 73a on the opposite side to the first force detection unit 11 (downside in FIG. 3) in the base portion 73. The motor provided in the base portion 73 is connected to a reducer and the output of the motor is reduced by the reducer and transmitted to the base portion 73.

The finger portions 74 extend from the support surface 73a of the base portion 73 nearly along the rotation shaft J1.

As shown in FIG. 4, the plurality of finger portions 74 are provided along the circumferential direction around the rotation shaft J1. The plurality of finger portions 74 are provided in the four corners of the base portion 73 in the initial state, for example. The finger portions 74 are movable in directions orthogonal to the rotation shaft J1. In the embodiment, the finger portions 74 are movable along the sides of the base portion 73. The finger portions 74 are movable along the forward and backward directions and the leftward and rightward directions.

As shown in FIG. 5, a cutout portion 74a is formed near the tip of the finger portion 74. The cutout portion 74a has a first surface 74b and a second surface 74c. The cutout portion 74a is formed, and thereby, a fitting portion 74d is formed on the tip of the finger portion 74. The fitting portion 74d projects in the forward and backward directions (X-axis directions).

In a state in which the first hand 71 grasps the end effector 30A, the finger portions 74 are inserted into the concave portions 50. More specifically, the fitting portions 74d are fitted in the concave portions 50. The fitting states between the fitting portions 74d and the concave portions 50 are the same in the respective finger portions 74 except that the orientations and the placements of the concave portions 50 are different, and, as below, the fitting state between the concave portion 51 and the fitting portion 74d will be representatively explained.

In the state in which the fitting portion 74d is fitted in the concave portion 51, the first surface 74b is in contact with the front surface of the front plate part 31. The lower surface of the fitting portion 74d is in contact with the first portion 51a of the concave portion 51. The upper surface (second surface 74c) of the fitting portion 74d is in contact with the second portion 51b of the concave portion 51. As shown in FIG. 4, the left side (−Y-side) surface of the fitting portion 74d is in contact with the third portion 51c of the concave portion 51. The back side (−X-side) surface of the fitting portion 74d is in contact with the fourth portion 51d of the concave portion 51.

The four finger portions 74 are fitted in the concave portions 51 to 54, and thereby, the end effector 30A is grasped by the first hand 71.

Note that gaps may be provided between the fitting portion 74d and the respective parts of the inner side surface of the concave portion 51.

As shown in FIG. 3, the palm portion 75 is attached to the base portion 73 via the shaft portion 76. The palm portion 75 is located between the finger portions 74. As shown in FIGS. 3 and 4, the palm portion 75 has e.g. a rectangular plate shape in the plan view. The shaft portion 76 is movably attached to the base portion 73 along the directions in which the rotation shaft J1 extends (in the upward and downward directions in the drawing). The shaft portion 76 has e.g. a cylindrical shape around the rotation shaft J1. The palm portion 75 is fixed to the end part of the shaft portion 76 on the opposite side to the base portion 73 (on the downside in FIG. 3). Thereby, the palm portion 75 is movable along the directions in which the rotation shaft J1 extends (in the upward and downward directions in the drawing).

The palm portion 75 moves in the upward and downward directions and operates the respective operation units of the respective end effectors. Specifically, in the end effector 30A, the palm portion 75 is inserted into the insertion space S and engaged with the upper wall portions 35e from downside. Thereby, the palm portion 75 moves to the upside, and thereby, the operation unit 35 can be moved to the upside and operated. In the end effectors 30B to 30D shown in FIGS. 6 to 8, the palm portion 75 moves to the downside and push the shaft parts of the respective operation units from upside to downside, and thereby, the respective operation units are operated. In the end effector 30E shown in FIG. 9, the palm portion 75 moves to the upside and pushes the shaft part 435a of the operation unit 435 from downside to upside, and thereby, the operation unit 435 is operated.

The first hand 71 shown in FIG. 1 is communicably connected to the robot control apparatus 25 by a cable. Thereby, the first hand 71 performs actions according to control signals acquired from the robot control apparatus 25. Wired communications via the cable are performed according to standards of e.g. Ethernet (registered trademark), USB (Universal Serial Bus), or the like. Or, the first hand 71 may be adapted to be connected to the robot control apparatus via wireless communications performed according to communication standards of Wi-Fi (registered trademark) or the like.

The first manipulator M1 has seven joints and a first imaging unit 21. Each of the seven joints has an actuator (not shown). In other words, the first arm having the first manipulator M1 is a seven-axis vertical articulated arm. Note that the first arm may be adapted to operate with the degree of freedom of eight or more axes.

Each of the actuators of the seven joints in the first manipulator M1 is communicably connected to the robot control apparatus 25 by a cable. Thereby, the actuators operate the first manipulator M1 based on the control signals acquired from the robot control apparatus 25. Wired communications via the cables are performed according to standards of e.g. Ethernet (registered trademark), USB, or the like. Or, part or all of the seven actuators of the first manipulator M1 may be adapted to be connected to the robot control apparatus 25 via wireless communications performed according to communication standards of Wi-Fi (registered trademark) or the like.

The first imaging unit 21 is e.g. a camera including a CCD (Charge Coupled Device) or CMOS (Complementary Metal Oxide Semiconductor) as an imaging device that converts collected lights into electric signals. In the example, the first imaging unit 21 is provided in a part of the first manipulator M1. Accordingly, the first imaging unit 21 moves in response to the movement of the first arm. Further, the range that the first imaging unit 21 can image changes in response to the movement of the first arm. The first imaging unit 21 may take a still image of the range or take a moving image of the range.

The first imaging unit 21 is communicably connected to the robot control apparatus 25 by a cable. Wired communications via the cables are performed according to standards of e.g. Ethernet (registered trademark), USB, or the like. Note that the first imaging unit 21 may be adapted to be connected to the robot control apparatus 25 via wireless communications performed according to communication standards of Wi-Fi (registered trademark) or the like.

The first force detection unit 11 is provided between the first hand 71 and the first manipulator M1. The first force detection unit 11 is e.g. a force sensor. The first force detection unit 11 detects a force and moment (torque) applied to the first hand 71 (or a flange for providing the first hand 71 on the first manipulator M1). The first force detection unit 11 outputs first force detection information containing values indicating magnitudes of the detected force and moment as output values to the robot control apparatus 25 via communications.

The first force detection information is used for control based on the first force detection information of the first arm by the robot control apparatus 25. The control based on the first force detection information refers to compliance control such as impedance control, for example. Note that the first force detection unit 11 may be another sensor such as a torque sensor that detects values indicating magnitudes of the force and moment applied to the first hand 71 (or the flange for providing the first hand 71 on the first manipulator M1).

The first force detection unit 11 is communicably connected to the robot control apparatus 25 by a cable. Wired communications via the cable are performed according to standards of e.g. Ethernet (registered trademark), USB, or the like. Note that the first force detection unit 11 and the robot control apparatus 25 may be adapted to be connected via wireless communications performed according to communication standards of Wi-Fi (registered trademark) or the like.

The second arm has the second hand 72, a second manipulator M2, and a second force detection unit 12. Note that, in the embodiment, the case where the second hand 72 is provided on the second arm is explained, however, the second hand 72 may be provided separately from the second arm. In this case, the second arm has the second manipulator M2 and the second force detection unit 12. The second manipulator M2 has seven joints and a second imaging unit 22.

The second hand 72, the second manipulator M2, and the second force detection unit 12 have the same configurations as the first hand 71, the first manipulator M1, and the first force detection unit 11 except that the arms in which they are provided are different.

The robot 20 has a third imaging unit 23 and a fourth imaging unit 24. The third imaging unit 23 is e.g. a camera including a CCD or CMOS as an imaging device that converts collected lights into electric signals. The third imaging unit 23 is provided in a part in which the unit can perform stereo imaging of the range that the fourth imaging unit 24 can image with the fourth imaging unit 24. The third imaging unit 23 is communicably connected to the robot control apparatus 25 by a cable. Wired communications via the cable are performed according to standards of e.g. Ethernet (registered trademark), USB, or the like. Note that the third imaging unit 23 may be adapted to be connected to the robot control apparatus 25 via wireless communications performed according to communication standards of Wi-Fi (registered trademark) or the like. The fourth imaging unit 24 is the same as the third imaging unit 23 except that the positions in which they are provided are different. The fourth imaging unit 24 is provided in a part in which the unit can perform stereo imaging of the range that the third imaging unit 23 can image with the third imaging unit 23.

In the example, the above described respective functional parts of the robot 20 acquire the control signals from the robot control apparatus 25 built in the robot 20. Then, the respective functional parts perform operations based on the acquired control signals. Note that the robot 20 may have a configuration controlled by the robot control apparatus 25 provided outside in place of the configuration containing the robot control apparatus 25.

Figure 10:
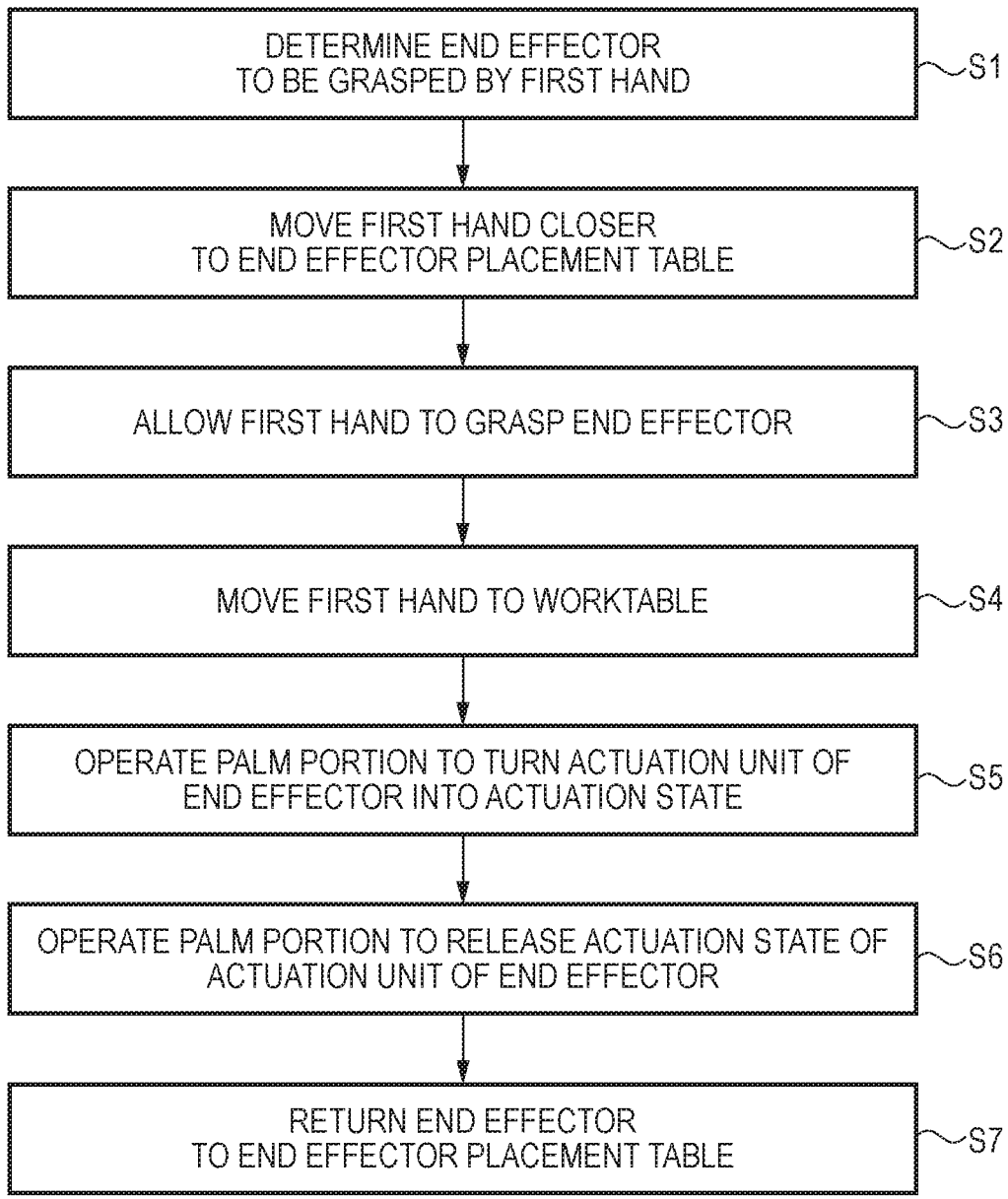
FIG. 10 is a flowchart showing an example of a procedure of control by a robot control apparatus of the embodiment.

Next, the control by the robot control apparatus 25 of the embodiment will be explained. FIG. 10 is a flowchart showing an example of a procedure of the control by the robot control apparatus 25. In FIG. 10, the case where the robot control apparatus 25 allows the first hand 71 to grasp the end effector is shown.

As shown in FIG. 10, the robot control apparatus 25 determines an end effector to be grasped by the first hand 71 according to a work performed by the robot 20 (step S1). Here, for example, the case of selecting the end effector 30A as the end effector to be grasped by the first hand 71 is explained.

The robot control apparatus 25 moves the first hand 71 to grasp the end effector 30A closer to the end effector placement table ET (step S2), and allows the first hand 71 to grasp the end effector 30A (step S3). The grasp of the end effector 30A will be described later in detail.

The robot control apparatus 25 moves the first hand 71 grasping the end effector 30A to the worktable WT (step S4). Then, the robot control apparatus 25 operates the palm portion 75 to turn the actuation unit 37 of the end effector 30A into an actuation state (step S5). Specifically, the palm portion 75 is moved to the upside and the scissors part 37a of the actuation unit 37 is closed. Thereby, the robot 20 performs a work of cutting an object by the scissors part 37a using the end effector 30A. In this manner, the robot control apparatus 25 controls the robot 20 to move the palm portion 75 in the upward and downward directions and operate the operation unit 35.

After the work by the actuation unit 37 is ended, the robot control apparatus 25 operates the palm portion 75 again and releases the actuation state of the actuation unit 37 of the end effector 30A (step S6). Specifically, the palm portion 75 is moved to the downside and the scissors part 37a of the actuation unit 37 is opened. The robot control apparatus 25 moves the first hand 71 to the end effector placement table ET, allows the first hand 71 to release the grasp state of the end effector 30A, and returns the end effector 30A to the end effector placement table ET (step S7).

The robot control apparatus 25 repeats the above described steps S1 to S7 to allow the robot 20 to sequentially perform various works.

Note that, in the above described example, the actuation unit 37 is once operated at steps S5, S6, and then, the end effector 30A is returned, however, not limited to that. The robot control apparatus 25 may repeat steps S5, S6 at a plurality of times, operate the actuation unit 37 at a plurality of times, and then, return the end effector 30A.

Figure 11:
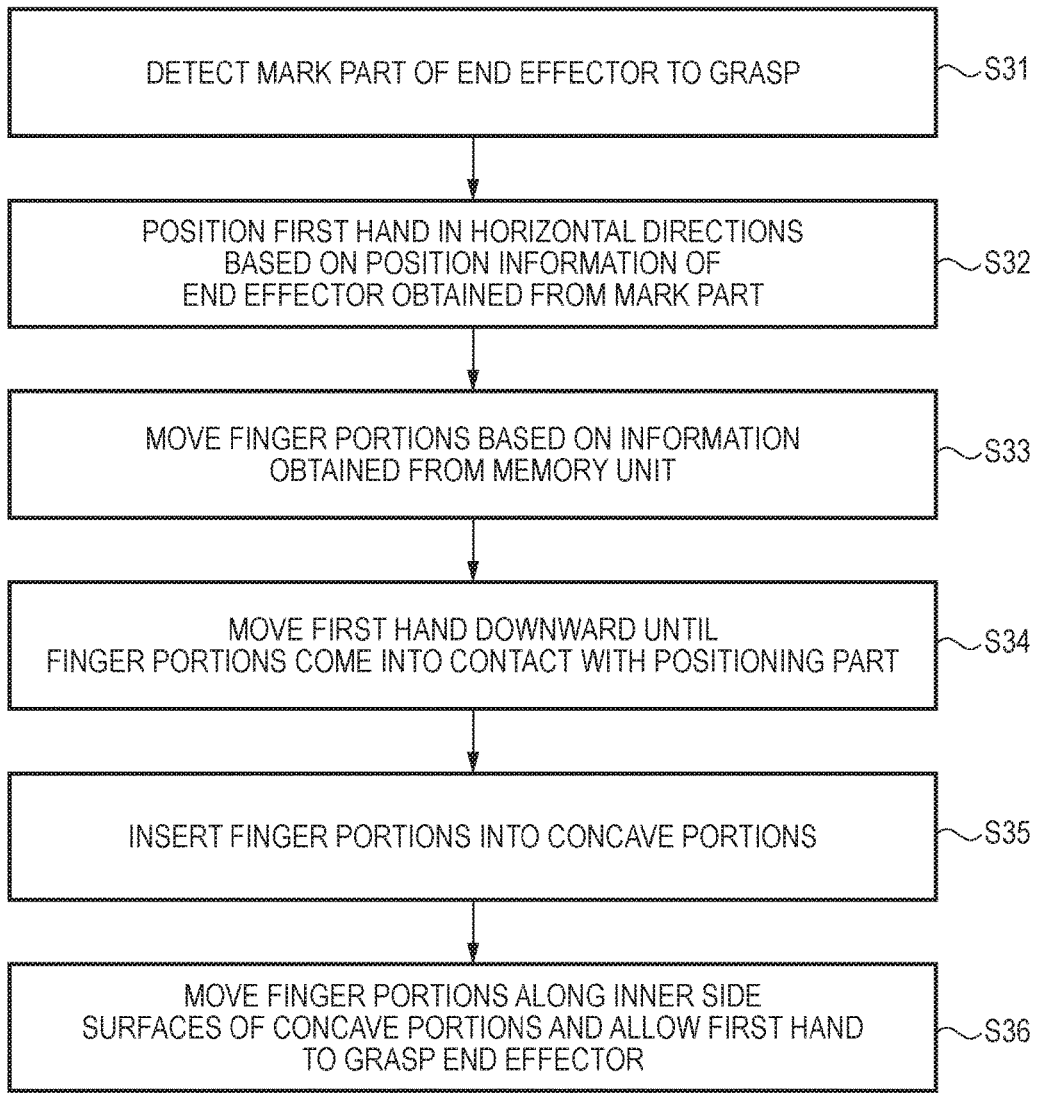
FIG. 11 is a flowchart showing an example of a procedure of the control by the robot control apparatus of the embodiment.
Figure 12:
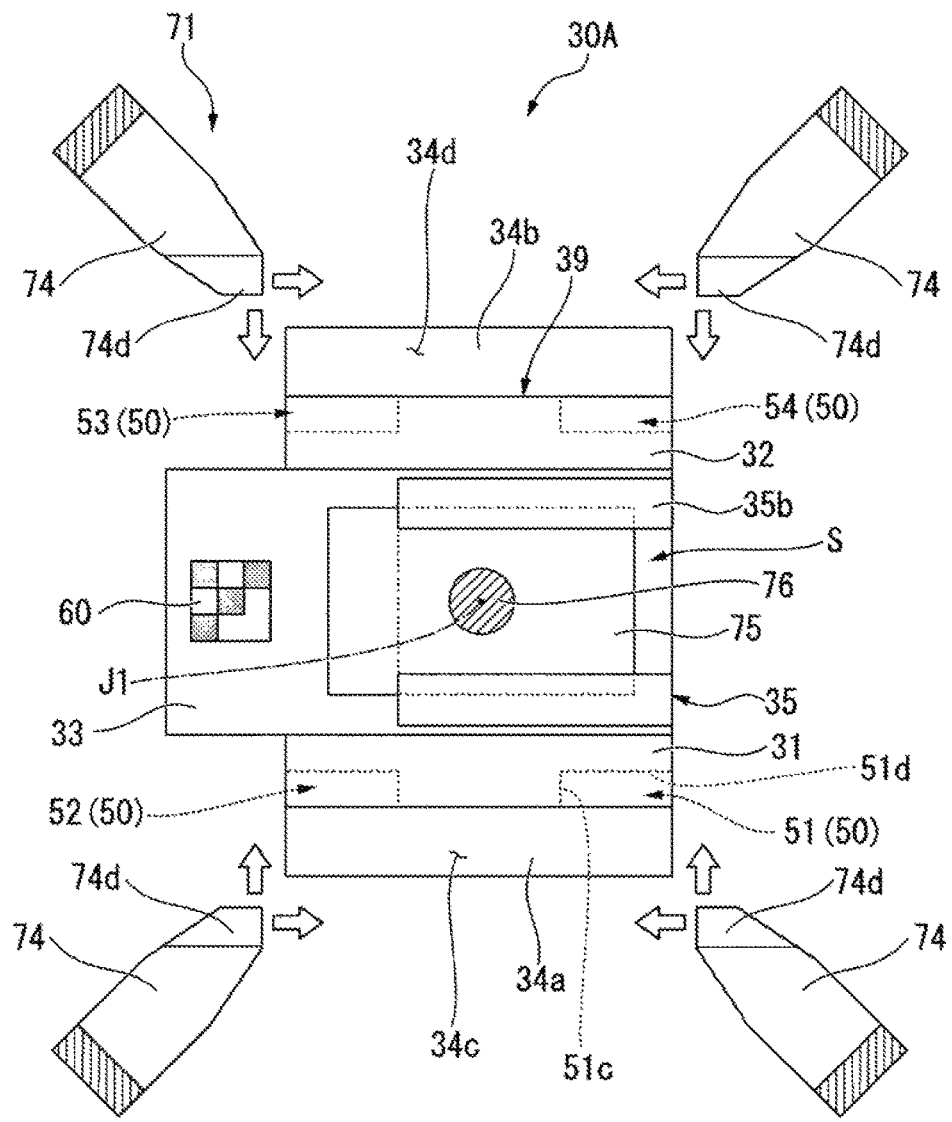
FIG. 12 is a plan view showing the example of the procedure of grasping the end effector of the embodiment.
Figure 13:
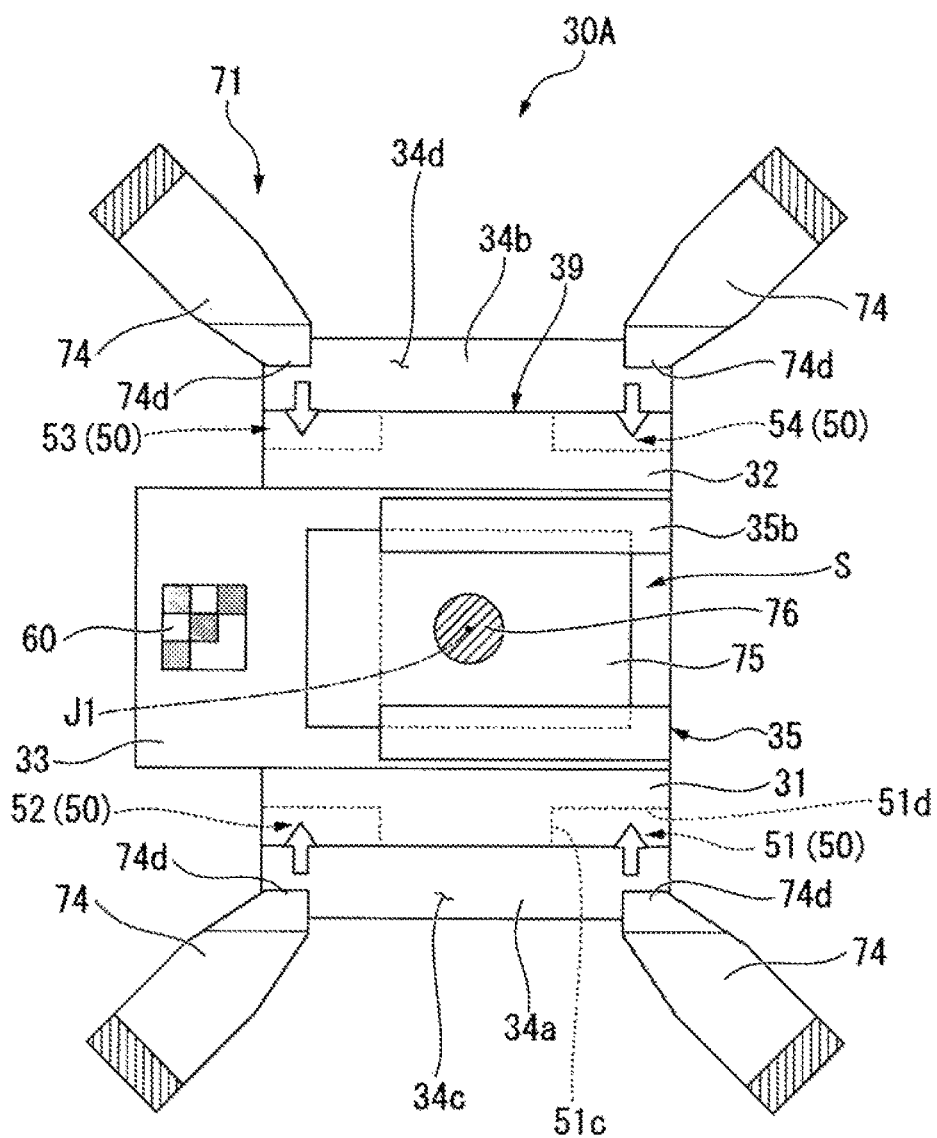
FIG. 13 is a plan view showing the example of the procedure of grasping the end effector of the embodiment.
Figure 14:
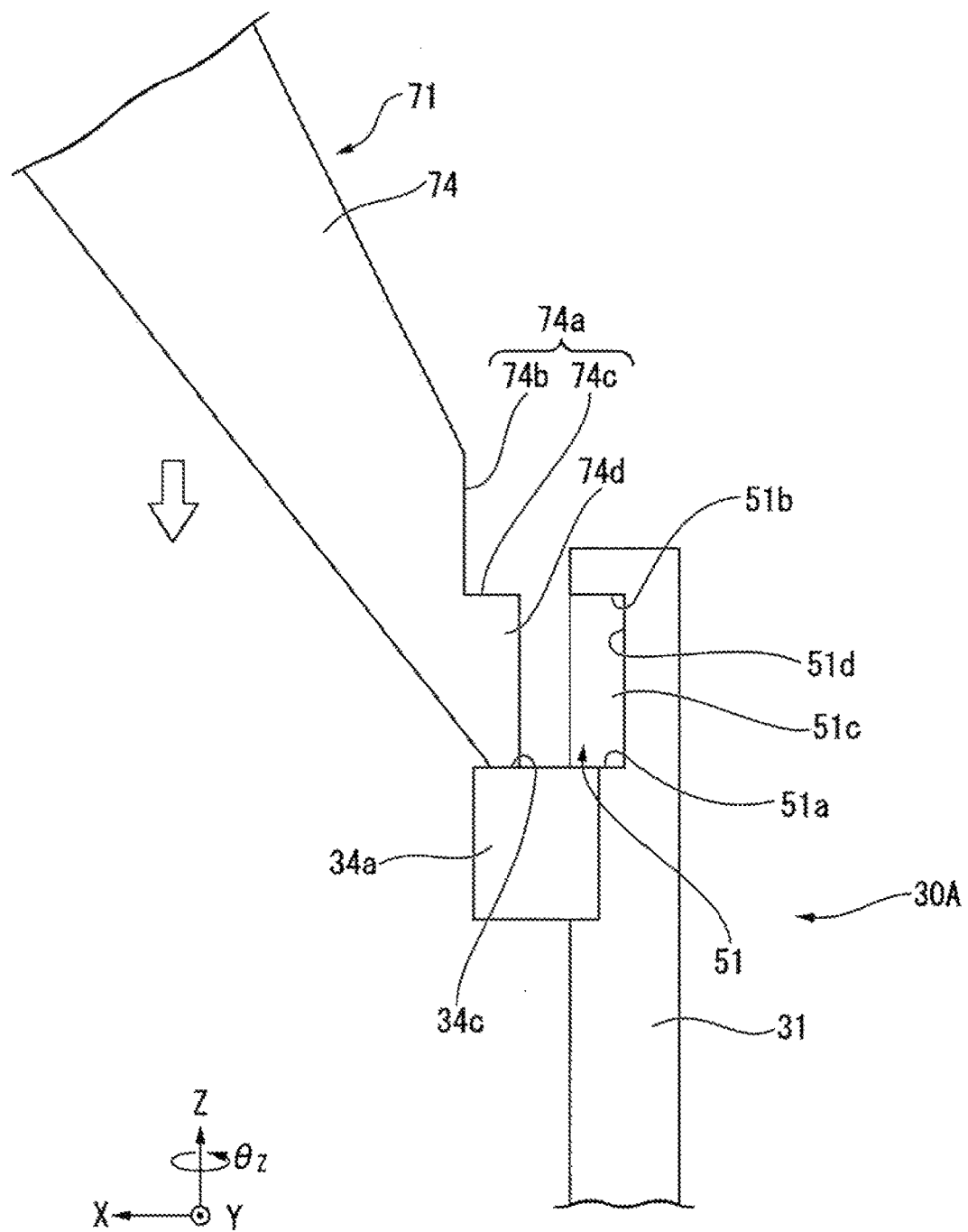
FIG. 14 is a side view showing the example of the procedure of grasping the end effector of the embodiment.
Figure 15:
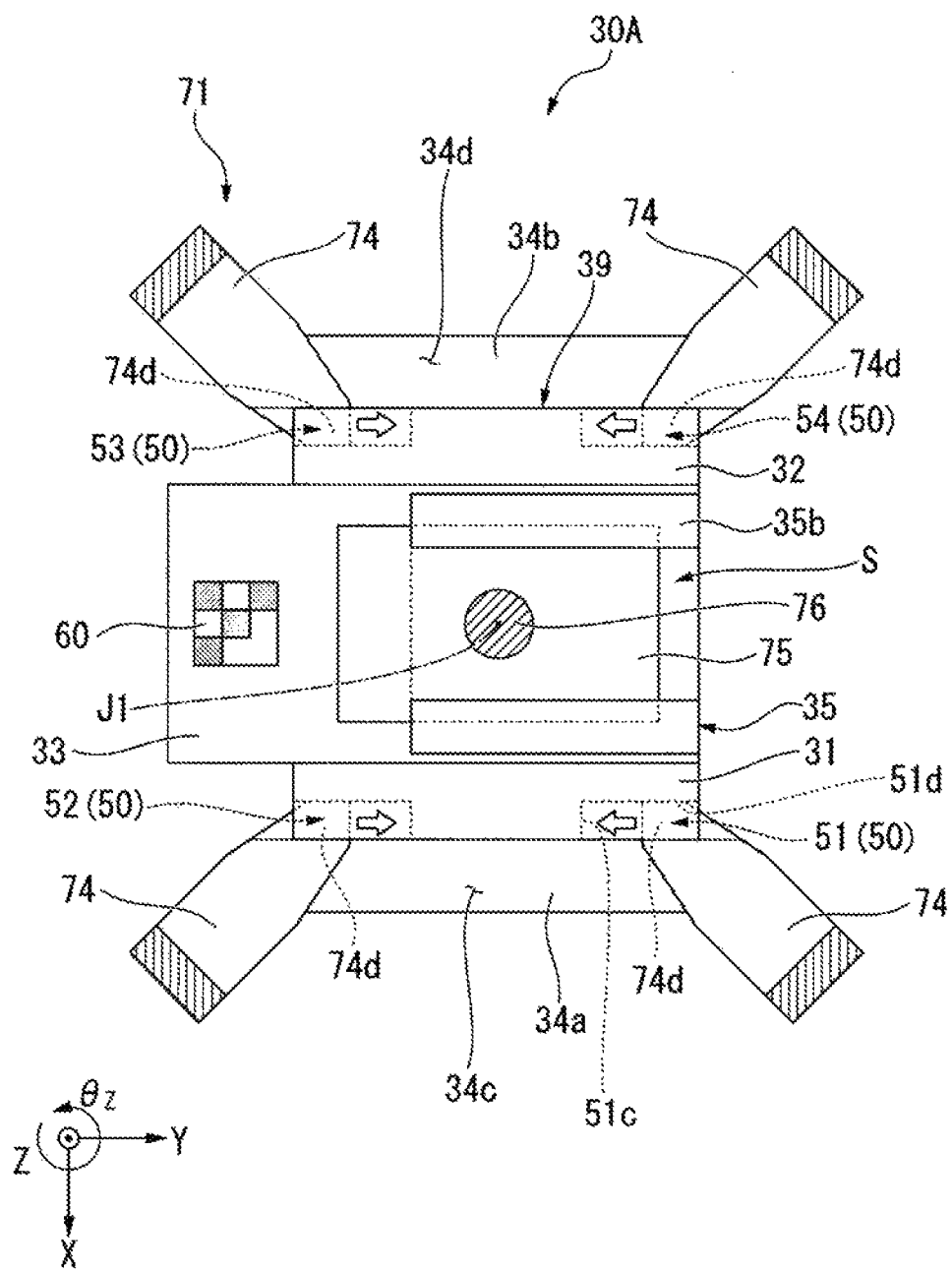
FIG. 15 is a plan view showing the example of the procedure of grasping the end effector of the embodiment.

Next, the procedure of the control of allowing the first hand 71 to grasp the end effector 30A by the robot control apparatus 25 will be explained in detail. FIG. 11 is a flowchart showing an example of the procedure of the control of allowing the first hand 71 to grasp the end effector 30A by the robot control apparatus 25. FIGS. 12, 13, and 15 are plan views showing the example of the procedure of grasping the end effector 30A by the first hand 71. FIG. 14 is a side view showing the example of the procedure of grasping the end effector 30A by the first hand 71.

As shown in FIG. 11, the robot control apparatus 25 detects the mark part 60 of the end effector 30A to grasp using e.g. the third imaging unit 23 and the fourth imaging unit 24 (step S31). The robot control apparatus 25 positions the first hand 71 in the horizontal directions with respect to the end effector 30A based on position information of the end effector 30A obtained from the mark part 60 (step S32).

Specifically, as shown in FIG. 12, the robot control apparatus 25 moves the first hand 71 to a horizontal position in which the operation unit 35 of the end effector 30A can be operated by the palm portion 75, i.e., a horizontal position in which the palm portion 75 and the operation unit 35 overlap in the plan view. For example, in the case of the end effector 30A, the robot control apparatus 25 moves the first hand 71 so that the palm portion 75 may be inserted into the insertion space S of the engaging part 35b.

Here, in the robot 20, e.g. a memory unit is provided and various kinds of information for grasping the end effector is stored in the memory unit. The robot control apparatus 25 obtains information for positioning the first hand 71 corresponding to the type of the end effector to grasp with reference to the memory unit. The information for positioning the first hand 71 includes e.g. a relative positional relationship among the plurality of concave portions in the end effector, a placement relationship among the plurality of finger portions 74 corresponding to the relative positional relationship among the plurality of concave portions, the shape of the operation unit, a movement method of the first hand 71 corresponding to the shape of the operation unit, etc. The robot control apparatus 25 moves and positions the first hand 71 in the horizontal directions in the above described manner based on the information obtained with reference to the memory unit.

Then, the robot control apparatus 25 moves the finger portions 74 based on the information obtained from the memory unit (step S33). Specifically, the apparatus moves the respective finger portions 74 in the horizontal directions, i.e., in the forward and backward directions and the leftward and rightward directions based on the relative positional relationship among the concave portions 50 of the end effector 30A to grasp. As shown in FIG. 13, the robot control apparatus 25 moves the finger portions 74 so that the lower ends of the fitting portions 74d may overlap with the upper surface 34c of the positioning part 34a or the upper surface 34d of the positioning part 34b in the plan view and face the concave portions 50 to be inserted in the forward and backward directions in the plan view.

Note that the time when referring to the information for moving the finger portions 74 from the memory unit at step S33 may be any time after the determination of the end effector to be grasped by the first hand 71 (step S1). Further, the time when moving the finger portions 74 as at step S33 may be any time before the next step S34.

Then, the robot control apparatus 25 moves the first hand 71 downward until the finger portions 74 come into contact with the positioning parts 34a, 34b (step S34). More specifically, as shown in FIG. 14, the robot control apparatus 25 moves the first hand 71 downward until the lower end of the finger portion 74 comes into contact with the upper surface 34c of the positioning part 34a (or the upper surface 34d of the positioning part 34b). The contacts between the lower ends of the finger portions 74 and the positioning parts 34 are detected by e.g. the first force detection unit 11 as the force sensor.

Then, the robot control apparatus 25 inserts the respective finger portions 74 into the concave portions 50 (step S35). More specifically, as shown by arrows in FIG. 13, the robot control apparatus 25 moves the respective finger portions 74 toward the concave portions 50 side in the forward and backward directions and fits the fitting portions 74d in the concave portions 50. As shown in FIG. 15, the robot control apparatus 25 moves the finger portions 74 until the fitting portions 74d come into contact with the fourth portions 51d of the concave portions 50. The contacts between the fitting portions 74d and the fourth portions 51d are detected by e.g. the first force detection unit 11 as the force sensor.

Then, the robot control apparatus 25 moves the finger portions 74 along the inner side surfaces of the concave portions 50 and allow the first hand 71 to grasp the end effector 30A (step S36). Specifically, as shown by arrows in FIG. 15, the robot control apparatus 25 moves the finger portions 74 along the fourth portions 51d in contact with the fitting portions 74d in the leftward and rightward directions, and allows the fitting portions 74d to come into contact with the third portions 51c of the concave portions 51. The contact between the finger portions 74 and the third portions 51c are detected by e.g. the first force detection unit 11 as the force sensor.

In the above described manner, as shown in FIG. 4, the robot control apparatus 25 inserts the finger portions 74 into the concave portions 50 and allows the first hand 71 to grasp the end effector 30A.

Note that, in the embodiment, the end effector 30A is mounted on the end effector placement table ET in the unfixed state. Accordingly, when the end effector 30A is grasped by the first hand 71, the position of the end effector 30A may be moved with the movement of the finger portions 74 at step S35 and step S36.

According to the embodiment, the concave portions 50 are formed in the end effector 30A and the robot 20 inserts the finger portions 74 into the concave portions 50, and thereby, the end effector 30A can be stably grasped by the first hand 71. Accordingly, when the operation unit 35 of the end effector 30A is operated by the movements of the palm portion 75 in the upward and downward directions, fluctuations of the position of the end effector 30A with respect to the first hand 71 can be suppressed. Thereby, the robot 20 can appropriately perform the work using the actuation unit 37 of the end effector 30A. Therefore, according to the embodiment, the end effector 30A grasped and operated by the robot 20 for the robot 20 to appropriately perform works is obtained. Further, the end effector 30A includes the operation unit 35, and thereby, the robot 20 can drive the end effector 30A to perform works without connection between the end effector 30A and the robot 20 with a cable.

Further, the torque control and the position control of the palm portion 75 are performed, and thereby, the amounts of movement and drive forces of the respective parts in the actuation units of the end effectors can be adjusted. Accordingly, in the end effector 30A, the force by the scissors part 37a at cutting of an object can be adjusted, and, in the end effectors 30B to 30D, the positions of the respective chuck parts and the forces applied to the annular members R at grasping along the inner diameters can be adjusted.

According to the embodiment, the first movable parts are the finger portions 74 and the second movable part is the palm portion 75. Accordingly, the robot 20 operates the operation unit 35 using the palm portion 75 in the state in which the end effector 30A is grasped by the finger portions 74. Accordingly, the robot 20 may easily perform works using the end effector 30A.

According to the embodiment, the inner side surfaces of the concave portion 51 include the first portion 51a and the second portion 51b opposed with the gap in the upward and downward directions in between. Accordingly, the movement of the finger portion 74 (fitting portion 74d) inserted into the concave portion 51 in the upward and downward directions can be restricted. Thereby, the movements of the grasped end effector 30A in the upward and downward directions with respect to the first hand 71 are suppressed. Further, the inner side surfaces of the concave portion 51 include the third portion 51c crossing the leftward and rightward directions. Accordingly, the movements of the finger portion 74 (fitting portion 74d) inserted into the concave portion 51 in the leftward and rightward directions can be restricted. Furthermore, the inner side surfaces of the concave portion 51 include the fourth portion 51d crossing the forward and backward directions. Accordingly, the movements of the finger portion 74 (fitting portion 74d) inserted into the concave portion 51 in the forward and backward directions can be restricted.

As described above, the movements of the finger portion 74 inserted into the concave portion 51 in the upward and downward directions, the leftward and rightward directions, and the forward and backward directions can be restricted, and the movements of the end effector 30A with respect to the first hand 71 in the respective directions and the rotations about the axes in parallel to the respective directions can be suppressed. Therefore, the accuracy of the works performed using the end effector 30A can be further improved.

Here, the works by the end effector 30A are performed by the operation of the operation unit 35 by the movements of the palm portion 75 in the upward and downward directions, and thus, particularly, the end effector 30A easily moves in the upward and downward directions with respect to the first hand 71. In this regard, the inner side surfaces of the concave portion 51 include the two portions opposed in the upward and downward directions, i.e., the first portion 51a and the second portion 51b, and thus, particularly, the movements of the finger portions 74 in the upward and downward directions with respect to the end effector 30A may be easily restricted.

According to the embodiment, the finger portions 74 have the fitting portions 74d to be fitted in the concave portions 50, and thus, the end effector 30A can be grasped more stably by the plurality of finger portions 74.

According to the embodiment, the mark part 60 used for positioning of the first hand 71 is provided. Accordingly, the mark part 60 is detected, and the first hand 71 can be accurately positioned with respect to the end effector 30A. Thereby, the plurality of types of end effectors 30A to 30E can be respectively easily and appropriately grasped by the first hand 71.

According to the embodiment, the positioning part 34a is provided. The upper surface 34c of the positioning part 34a is located in the same position as that of the first portion 51a of the concave portion 51 in the upward and downward directions. Accordingly, the finger portion 74 is brought into contact with the positioning part 34a from the upside, and the height of the finger portion 74 can be accurately positioned with respect to the concave portion 51. Thereby, the finger portion 74 may be easily inserted into the concave portion 51.

According to the embodiment, at step S35 and step S36, the contact of the finger portions 74 with the inner side surfaces of the concave portions 50 are detected by the force sensor and the movements of the finger portions 74 are controlled. Thereby, the plurality of finger portions 74 can be accurately and easily moved to the suitable grasp positions. Therefore, the end effector 30A can be grasped more stably by the first hand 71.

According to the embodiment, as the concave portions 50, the four concave portions 51 to 54 are formed and the respective concave portions 51 to 54 are placed to surround the center of the main body unit 39 as seen along the upward and downward directions. Accordingly, the four finger portions 74 are respectively inserted into the concave portions 51 to 54, and thereby, the main body unit 39 of the end effector 30A can be grasped more stably.

According to the embodiment, the springs for applying elastic forces in the upward and downward directions to the operation unit are provided in the respective end effectors. Accordingly, even when the direction in which a force is applied to the operation unit by the palm portion 75 is one direction of the upward and downward directions, the operation unit can be moved in both directions of the upward and downward directions and the state of the actuation unit can be switched. Thereby, even when the engaging part for engaging the palm portion 75 with the operation unit is not provided like the end effectors 30B to 30E, the state of the actuation unit can be switched.

According to the embodiment, the respective operation units of the end effectors 30B to 30E are the cylinders. Accordingly, the respective actuation units of the respective end effectors 30B to 30E can be driven using air pressure. Thereby, the force control of the respective actuation units may be easily performed. Therefore, in the end effectors 30B to 30D, for example, application of an excessive force to the annular member R and breakage of the annular member R can be suppressed. Further, in the end effector 30E, the suction grasp can be realized without providing a mechanism of suctioning the substrate P in the first hand 71 itself.

Note that the invention is not limited to the above described embodiment, but may employ other configurations and methods.

The number of concave portions formed in the single effector may be three or less or five or more. For stable grasp by the first hand 71, it is preferable that the umber of concave portions formed in the single effector is two or more.

The shape of the concave portion is not particularly limited as long as the finger portion 74 may be inserted into it. Further, the plurality of concave portions formed in the single end effector may have different shapes from one another.

The first movable parts are not limited to the finger portions 74 and the second movable part is not limited to the palm portion 75. For example, both the first movable parts and the second movable part may be the finger portions 74. In this case, part of the plurality of finger portions 74 may be inserted into the concave portions to grasp the end effector and the operation unit 35 may be operated by the rest of the plurality of finger portions 74.

It is not necessarily required that the positioning parts 34a, 34b are provided. In this case, at step S34, the positions of the finger portions 74 in the upward and downward directions may be adjusted using the third imaging unit 23 and the fourth imaging unit 24.

The mark part 60 is not particularly limited as long as it is used for the positioning of the first hand 71. For example, the mark part 60 may be a shape, a part, or the like of the end effector itself. Or, it is not necessarily required to provide the mark part 60.

The end effector to which the invention is applied is not particularly limited, but may be another end effector than the end effectors 30A to 30E. The works that can be executed by the end effector are not particularly limited.

The works performed by the robot 20 using the end effector on the worktable WT are not particularly limited. The works performed by the robot 20 may be assembly works or processing including cutting, machining, welding of objects.

The above described respective configurations may be combined as appropriate within a range consistent with each other.

The entire disclosure of Japanese Patent Application No. 2016-061381, filed Mar. 25, 2016 is expressly incorporated by reference herein.

What is claimed is:

1. An end effector to be grasped by a robot including a hand having a plurality of first movable parts and a second movable part using the hand, comprising:

an operation unit operated by movements of the second movable part in first directions; and
an actuation unit actuated by an operation of the operation unit,
wherein concave portions into which the first movable parts are inserted are formed.

2. The end effector according to claim 1, wherein the first movable parts are finger portions, and
the second movable part is a palm portion.

3. The end effector according to claim 1, wherein inner side surfaces of the concave portion include:
a first portion and a second portion opposed to each other with a gap in the first directions in between;
a third portion crossing second directions orthogonal to the first directions; and
a fourth portion crossing third directions orthogonal to both the first directions and the second directions.

4. The end effector according to claim 1, further comprising a mark part detected by the robot and used for positioning of the hand when the robot grasps the end effector.

5. The end effector according to claim 1, further comprising a main body unit in which the concave portions are formed,
wherein four of the concave portions are formed, and
the four concave portions are placed to surround a center of the main body unit as seen along the first directions.

6. The end effector according to claim 1, wherein the operation unit is a cylinder.

7. A robot that grasps the end effector according to claim 1, comprising:
an arm; and
a hand provided on the arm,
wherein the hand includes
a plurality of first movable parts inserted into the concave portions, and
a second movable part moving in the first directions and operating the operation unit.

8. A robot that grasps the end effector according to claim 2, comprising:
an arm; and
a hand provided on the arm,
wherein the hand includes
a plurality of first movable parts inserted into the concave portions, and
a second movable part moving in the first directions and operating the operation unit.

9. A robot that grasps the end effector according to claim 3, comprising:
an arm; and
a hand provided on the arm,
wherein the hand includes
a plurality of first movable parts inserted into the concave portions, and
a second movable part moving in the first directions and operating the operation unit.

10. A robot that grasps the end effector according to claim 4, comprising:
an arm; and
a hand provided on the arm,
wherein the hand includes
a plurality of first movable parts inserted into the concave portions, and
a second movable part moving in the first directions and operating the operation unit.

11. A robot that grasps the end effector according to claim 5, comprising:
an arm; and a hand provided on the arm,
wherein the hand includes
- a plurality of first movable parts inserted into the concave portions, and
- a second movable part moving in the first directions and operating the operation unit.

12. A robot that grasps the end effector according to claim 6, comprising:
an arm; and
a hand provided on the arm,
wherein the hand includes
- a plurality of first movable parts inserted into the concave portions, and
- a second movable part moving in the first directions and operating the operation unit.

13. The robot according to claim 7, wherein the first movable part includes a fitting portion to be fitted in the concave portion.

14. A robot control apparatus for the robot according to claim 7, controlling the robot to insert the first movable parts into the concave portions and allowing the robot to grasp the end effector, and moving the second movable part in the first directions and operating the operation unit.

15. A robot control apparatus for the robot according to claim 13, controlling the robot to insert the first movable parts into the concave portions and allowing the robot to grasp the end effector, and moving the second movable part in the first directions and operating the operation unit.

* * * * *